(12) United States Patent
Arnone et al.

(10) Patent No.: US 10,140,813 B2
(45) Date of Patent: *Nov. 27, 2018

(54) ENRICHED GAME PLAY ENVIRONMENT

(71) Applicant: Gamblit Gaming, LLC, Glendale, CA (US)

(72) Inventors: Miles Arnone, Sherborn, MA (US); Eric Meyerhofer, Pasadena, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,433

(22) Filed: Dec. 18, 2017

(65) Prior Publication Data

US 2018/0108215 A1 Apr. 19, 2018

Related U.S. Application Data

(63) Continuation of application No. 15/252,190, filed on Aug. 30, 2016, now Pat. No. 9,870,675, which is a
(Continued)

(51) Int. Cl.
*A63F 9/24* (2006.01)
*G07F 17/32* (2006.01)
(Continued)

(52) U.S. Cl.
CPC .......... *G07F 17/3244* (2013.01); *A63F 13/00* (2013.01); *G07F 17/3225* (2013.01);
(Continued)

(58) Field of Classification Search
USPC ......................................... 463/16–25, 40–42
See application file for complete search history.

(56) References Cited

U.S. PATENT DOCUMENTS 5,413,357 A 5/1995 Schulze et al.
5,718,429 A 2/1998 Keller
(Continued)

FOREIGN PATENT DOCUMENTS

JP 2001300098 10/2001
JP 2003111980 4/2003
(Continued)

OTHER PUBLICATIONS

U.S. Appl. No. 14/205,303 Arnone, et al., filed Mar. 11, 2014.
(Continued)

*Primary Examiner* — Masud Ahmed
(74) *Attorney, Agent, or Firm* — Caitlyn Ross

(57) ABSTRACT

Systems and methods for a gaming machine are provided. A gaming machine includes a game world engine, and a real world engine. The game world engine provides an entertainment game including a plurality of levels, generates a trigger based on a player using an enabling element of the entertainment game, accumulates game world credit based on the player's use of the enabling element, determines a progress from a first level of the entertainment game to a second level of entertainment game on the basis of the game world credit, and selects a level real world credit play table on the basis of the progress. The real world engine receives the trigger from the game world engine and executes a gambling game to determine a gambling outcome using the random number generator, the level real world credit pay table, and a wager of an amount of the real world credit.

20 Claims, 11 Drawing Sheets

Related U.S. Application Data continuation of application No. 14/536,231, filed on Nov. 7, 2014, now Pat. No. 9,430,902, which is a continuation of application No. 14/135,562, filed on Dec. 19, 2013, now Pat. No. 8,882,586, which is a continuation of application No. 13/582,408, filed as application No. PCT/US2011/026768 on Mar. 1, 2011, now Pat. No. 8,632,395, said application No. 14/135,562 is a continuation of application No. 13/849,458, filed on Mar. 22, 2013, now abandoned, which is a continuation of application No. 13/600,671, filed on Aug. 31, 2012, now Pat. No. 8,475,266, which is a continuation of application No. PCT/US2011/026768, filed on Mar. 1, 2011.

(60) Provisional application No. 61/339,187, filed on Mar. 1, 2010, provisional application No. 61/343,312, filed on Apr. 27, 2010, provisional application No. 61/397,630, filed on Jun. 15, 2010, provisional application No. 61/401,891, filed on Aug. 20, 2010.

(51) Int. Cl.
  *A63F 13/00* (2014.01)
  *A63F 13/798* (2014.01)

(52) U.S. Cl.
  CPC ...... *G07F 17/3272* (2013.01); *G07F 17/3286* (2013.01); *G07F 17/3295* (2013.01); *A63F 13/798* (2014.09)

(56) References Cited

U.S. PATENT DOCUMENTS

| | | |
|---|---|---|
| 5,785,592 A | 7/1998 | Jacobsen |
| 5,853,324 A | 12/1998 | Kami et al. |
| 5,963,745 A | 10/1999 | Collins et al. |
| 6,050,895 A | 4/2000 | Luciano |
| 6,165,071 A | 12/2000 | Weiss |
| 6,227,974 B1 | 5/2001 | Eilat |
| 6,267,669 B1 | 7/2001 | Luciano |
| 6,302,791 B1 | 10/2001 | Frohm et al. |
| 6,685,563 B1 | 2/2004 | Meekins et al. |
| 6,712,693 B1 | 3/2004 | Hettinger |
| 6,761,632 B2 | 7/2004 | Bansemer et al. |
| 6,761,633 B2 | 7/2004 | Riendeau |
| 6,764,397 B1 | 7/2004 | Robb |
| 6,811,482 B2 | 11/2004 | Letovsky |
| 7,118,105 B2 | 10/2006 | Benevento |
| 7,294,058 B1 | 11/2007 | Slomiany |
| 7,326,115 B2 | 2/2008 | Baerlocher |
| 7,361,091 B2 | 4/2008 | Letovsky |
| 7,517,282 B1 | 4/2009 | Pryor |
| 7,575,517 B2 | 8/2009 | Parham et al. |
| 7,682,239 B2 | 3/2010 | Friedman et al. |
| 7,720,733 B2 | 5/2010 | Jung |
| 7,753,770 B2 | 7/2010 | Walker et al. |
| 7,753,790 B2 | 7/2010 | Nguyen |
| 7,766,742 B2 | 8/2010 | Bennett et al. |
| 7,775,885 B2 | 8/2010 | Van Luchene |
| 7,798,896 B2 | 9/2010 | Katz |
| 7,828,657 B2 | 11/2010 | Booth |
| 7,917,371 B2 | 3/2011 | Jung et al. |
| 7,931,531 B2 | 4/2011 | Oberberger |
| 7,938,727 B1 | 5/2011 | Konkle |
| 7,950,993 B2 | 5/2011 | Oberberger |
| 7,967,674 B2 | 6/2011 | Baerlocher |
| 7,980,948 B2 | 7/2011 | Rowe |
| 7,996,264 B2 | 8/2011 | Kusumoto et al. |
| 8,012,023 B2 | 9/2011 | Gates |
| 8,047,908 B2 | 11/2011 | Walker |
| 8,047,915 B2 | 11/2011 | Lyle |
| 8,060,829 B2 | 11/2011 | Jung et al. |
| 8,075,383 B2 | 12/2011 | Friedman et al. |
| 8,087,999 B2 | 1/2012 | Oberberger |
| 8,113,938 B2 | 2/2012 | Friedman et al. |
| 8,118,654 B1 | 2/2012 | Nicolas |
| 8,128,487 B2 | 3/2012 | Hamilton et al. |
| 8,135,648 B2 | 3/2012 | Oram |
| 8,137,193 B1 | 3/2012 | Kelly et al. |
| 8,142,272 B2 | 3/2012 | Walker |
| 8,157,653 B2 | 4/2012 | Buhr |
| 8,167,695 B2 | 5/2012 | Rowe |
| 8,167,699 B2 | 5/2012 | Inamura |
| 8,177,628 B2 | 5/2012 | Manning |
| 8,182,338 B2 | 5/2012 | Thomas |
| 8,182,339 B2 | 5/2012 | Anderson |
| 8,187,068 B2 | 5/2012 | Slomiany |
| 8,206,210 B2 | 6/2012 | Walker |
| 8,308,544 B2 | 11/2012 | Friedman |
| 8,430,735 B2 | 4/2013 | Oberberger |
| 8,475,266 B2 | 7/2013 | Amone |
| 8,480,470 B2 | 7/2013 | Napolitano et al. |
| 8,485,893 B2 | 7/2013 | Rowe |
| 8,622,809 B1 | 1/2014 | Arora et al. |
| 8,864,564 B2 | 10/2014 | Oberberger |
| 8,998,694 B2 | 4/2015 | Rowe |
| 9,070,257 B1 | 6/2015 | Scalise |
| 9,092,946 B2 | 7/2015 | Rowe |
| 9,111,412 B2 | 8/2015 | Rowe |
| 9,454,873 B2 | 9/2016 | Rowe |
| 2001/0004609 A1 | 6/2001 | Walker et al. |
| 2001/0019965 A1 | 9/2001 | Ochi |
| 2002/0022509 A1 | 2/2002 | Nicastro |
| 2002/0090990 A1 | 7/2002 | Joshi et al. |
| 2002/0175471 A1 | 11/2002 | Faith |
| 2003/0060286 A1 | 3/2003 | Walker et al. |
| 2003/0119576 A1 | 6/2003 | McClintic et al. |
| 2003/0139214 A1 | 7/2003 | Wolf et al. |
| 2003/0171149 A1 | 9/2003 | Rothschild |
| 2003/0204565 A1 | 10/2003 | Guo et al. |
| 2003/0211879 A1 | 11/2003 | Englman |
| 2004/0092313 A1 | 5/2004 | Saito et al. |
| 2004/0102238 A1 | 5/2004 | Taylor |
| 2004/0121839 A1 | 6/2004 | Webb |
| 2004/0225387 A1 | 11/2004 | Smith |
| 2005/0003878 A1 | 1/2005 | Updike |
| 2005/0096124 A1 | 5/2005 | Stronach |
| 2005/0116411 A1 | 6/2005 | Herrmann et al. |
| 2005/0192087 A1 | 9/2005 | Friedman et al. |
| 2005/0233791 A1 | 10/2005 | Kane |
| 2005/0233806 A1 | 10/2005 | Kane et al. |
| 2005/0239538 A1 | 10/2005 | Dixon |
| 2005/0269778 A1 | 12/2005 | Samberg |
| 2005/0288101 A1 | 12/2005 | Lockton et al. |
| 2006/0003823 A1 | 1/2006 | Zhang |
| 2006/0003830 A1 | 1/2006 | Walker et al. |
| 2006/0035696 A1 | 2/2006 | Walker |
| 2006/0040735 A1 | 2/2006 | Baerlocher |
| 2006/0068913 A1 | 3/2006 | Walker et al. |
| 2006/0084499 A1 | 4/2006 | Moshal |
| 2006/0084505 A1 | 4/2006 | Yoseloff |
| 2006/0135250 A1 | 6/2006 | Rossides |
| 2006/0154710 A1 | 7/2006 | Serafat |
| 2006/0166729 A1 | 7/2006 | Saffari et al. |
| 2006/0189371 A1 | 8/2006 | Walker et al. |
| 2006/0223611 A1 | 10/2006 | Baerlocher |
| 2006/0234791 A1 | 10/2006 | Nguyen et al. |
| 2006/0240890 A1 | 10/2006 | Walker |
| 2006/0246403 A1 | 11/2006 | Monpouet et al. |
| 2006/0258433 A1 | 11/2006 | Finocchio et al. |
| 2007/0026924 A1 | 2/2007 | Taylor |
| 2007/0035548 A1 | 2/2007 | Jung et al. |
| 2007/0038559 A1 | 2/2007 | Jung et al. |
| 2007/0064074 A1 | 3/2007 | Silverbrook et al. |
| 2007/0087799 A1 | 4/2007 | Van Luchene |
| 2007/0093299 A1 | 4/2007 | Bergeron |
| 2007/0099696 A1 | 5/2007 | Nguyen et al. |
| 2007/0117641 A1 | 5/2007 | Walker et al. |
| 2007/0129149 A1 | 6/2007 | Walker |
| 2007/0142108 A1 | 6/2007 | Linard |
| 2007/0156509 A1 | 7/2007 | Jung et al. |
| 2007/0167212 A1 | 7/2007 | Nguyen |

(56) References Cited

U.S. PATENT DOCUMENTS

| | | |
|---|---|---|
| 2007/0167239 A1 | 7/2007 | O'Rourke |
| 2007/0173311 A1 | 7/2007 | Morrow et al. |
| 2007/0191104 A1 | 8/2007 | Van Luchene |
| 2007/0202941 A1 | 8/2007 | Miltenberger |
| 2007/0203828 A1 | 8/2007 | Jung et al. |
| 2007/0207847 A1 | 9/2007 | Thomas |
| 2007/0259717 A1 | 11/2007 | Mattice |
| 2007/0293306 A1 | 12/2007 | Nee et al. |
| 2008/0004107 A1 | 1/2008 | Nguyen et al. |
| 2008/0014835 A1 | 1/2008 | Weston et al. |
| 2008/0015004 A1 | 1/2008 | Gatto et al. |
| 2008/0064488 A1 | 3/2008 | Oh |
| 2008/0070659 A1 | 3/2008 | Naicker |
| 2008/0070690 A1 | 3/2008 | Van Luchene |
| 2008/0070702 A1 | 3/2008 | Kaminkow |
| 2008/0096665 A1 | 4/2008 | Cohen |
| 2008/0108406 A1 | 5/2008 | Oberberger |
| 2008/0108425 A1 | 5/2008 | Oberberger |
| 2008/0113704 A1 | 5/2008 | Jackson |
| 2008/0119283 A1 | 5/2008 | Baerlocher |
| 2008/0146308 A1 | 6/2008 | Okada |
| 2008/0161081 A1 | 7/2008 | Berman |
| 2008/0176619 A1 | 7/2008 | Kelly |
| 2008/0191418 A1 | 8/2008 | Lutnick et al. |
| 2008/0195481 A1 | 8/2008 | Lutnick |
| 2008/0248850 A1 | 10/2008 | Schugar |
| 2008/0254893 A1 | 10/2008 | Patel |
| 2008/0274796 A1 | 11/2008 | Lube |
| 2008/0274798 A1 | 11/2008 | Walker et al. |
| 2008/0311980 A1 | 12/2008 | Cannon |
| 2008/0318668 A1 | 12/2008 | Ching |
| 2009/0011827 A1 | 1/2009 | Englman |
| 2009/0023489 A1 | 1/2009 | Toneguzzo |
| 2009/0023492 A1 | 1/2009 | Erfanian |
| 2009/0061974 A1 | 3/2009 | Lutnick et al. |
| 2009/0061975 A1 | 3/2009 | Ditchev |
| 2009/0061991 A1 | 3/2009 | Popovich |
| 2009/0061997 A1 | 3/2009 | Popovich |
| 2009/0061998 A1 | 3/2009 | Popovich |
| 2009/0061999 A1 | 3/2009 | Popovich |
| 2009/0082093 A1 | 3/2009 | Okada |
| 2009/0088239 A1 | 4/2009 | Iddings |
| 2009/0098934 A1 | 4/2009 | Amour |
| 2009/0118006 A1 | 5/2009 | Kelly et al. |
| 2009/0124344 A1 | 5/2009 | Mitchell et al. |
| 2009/0131158 A1 | 5/2009 | Brunet De Courssou et al. |
| 2009/0131175 A1 | 5/2009 | Kelly et al. |
| 2009/0143141 A1 | 6/2009 | Wells |
| 2009/0149233 A1 | 6/2009 | Strause et al. |
| 2009/0156297 A1 | 6/2009 | Andersson et al. |
| 2009/0176560 A1 | 7/2009 | Herrmann et al. |
| 2009/0176566 A1 | 7/2009 | Kelly |
| 2009/0181777 A1 | 7/2009 | Christiani |
| 2009/0221355 A1 | 9/2009 | Dunaevsky et al. |
| 2009/0239610 A1 | 9/2009 | Olive |
| 2009/0247272 A1 | 10/2009 | Abe |
| 2009/0270164 A1 | 10/2009 | Seelig |
| 2009/0291755 A1 | 11/2009 | Walker et al. |
| 2009/0309365 A1 | 12/2009 | May |
| 2009/0312093 A1 | 12/2009 | Walker et al. |
| 2009/0325686 A1 | 12/2009 | Davis |
| 2010/0004058 A1 | 1/2010 | Acres |
| 2010/0016056 A1 | 1/2010 | Thomas et al. |
| 2010/0029373 A1 | 2/2010 | Graham et al. |
| 2010/0035674 A1 | 2/2010 | Slomiany |
| 2010/0056247 A1 | 3/2010 | Nicely |
| 2010/0056260 A1 | 3/2010 | Fujimoto |
| 2010/0062836 A1 | 3/2010 | Young |
| 2010/0093420 A1 | 4/2010 | Wright |
| 2010/0093444 A1 | 4/2010 | Biggar et al. |
| 2010/0105454 A1 | 4/2010 | Weber |
| 2010/0120525 A1 | 5/2010 | Baerlocher et al. |
| 2010/0124983 A1 | 5/2010 | Gowin et al. |
| 2010/0137047 A1 | 6/2010 | Englman et al. |
| 2010/0174593 A1 | 7/2010 | Cao |
| 2010/0184509 A1 | 7/2010 | Sylla et al. |
| 2010/0203940 A1 | 8/2010 | Alderucci et al. |
| 2010/0210344 A1 | 8/2010 | Edidin et al. |
| 2010/0227672 A1 | 9/2010 | Amour |
| 2010/0227688 A1 | 9/2010 | Lee |
| 2010/0240436 A1 | 9/2010 | Wilson et al. |
| 2010/0285869 A1 | 11/2010 | Walker |
| 2010/0304825 A1 | 12/2010 | Davis |
| 2010/0304839 A1 | 12/2010 | Johnson |
| 2010/0304842 A1 | 12/2010 | Friedman et al. |
| 2011/0009177 A1 | 1/2011 | Katz |
| 2011/0009178 A1 | 1/2011 | Gerson |
| 2011/0045896 A1 | 2/2011 | Sak et al. |
| 2011/0070945 A1 | 3/2011 | Walker |
| 2011/0077087 A1 | 3/2011 | Walker et al. |
| 2011/0082571 A1 | 4/2011 | Murdock et al. |
| 2011/0105206 A1 | 5/2011 | Rowe et al. |
| 2011/0107239 A1 | 5/2011 | Adoni |
| 2011/0109454 A1 | 5/2011 | McSheffrey |
| 2011/0111820 A1 | 5/2011 | Filipour |
| 2011/0111837 A1 | 5/2011 | Gagner |
| 2011/0111841 A1 | 5/2011 | Tessmer |
| 2011/0118011 A1 | 5/2011 | Filipour et al. |
| 2011/0201413 A1 | 8/2011 | Oberberger |
| 2011/0207523 A1 | 8/2011 | Filipour et al. |
| 2011/0212766 A1 | 9/2011 | Bowers |
| 2011/0212767 A1 | 9/2011 | Barclay |
| 2011/0218028 A1 | 9/2011 | Acres |
| 2011/0218035 A1 | 9/2011 | Thomas |
| 2011/0230258 A1 | 9/2011 | Van Luchene |
| 2011/0230260 A1 | 9/2011 | Morrow et al. |
| 2011/0230267 A1 | 9/2011 | Van Luchene |
| 2011/0244944 A1 | 10/2011 | Baerlocher |
| 2011/0263312 A1 | 10/2011 | De Waal |
| 2011/0269522 A1 | 11/2011 | Nicely et al. |
| 2011/0275440 A1 | 11/2011 | Faktor |
| 2011/0287828 A1 | 11/2011 | Anderson et al. |
| 2011/0287841 A1 | 11/2011 | Watanabe |
| 2011/0312408 A1 | 12/2011 | Okuaki |
| 2011/0319169 A1 | 12/2011 | Lam |
| 2012/0004747 A1 | 1/2012 | Kelly |
| 2012/0028718 A1 | 2/2012 | Barclay et al. |
| 2012/0058814 A1 | 3/2012 | Lutnick |
| 2012/0077569 A1 | 3/2012 | Watkins |
| 2012/0108323 A1 | 5/2012 | Kelly |
| 2012/0135793 A1 | 5/2012 | Antonopoulos |
| 2012/0202587 A1 | 8/2012 | Allen |
| 2012/0302311 A1 | 11/2012 | Luciano |
| 2012/0322545 A1 | 12/2012 | Arnone et al. |
| 2013/0029760 A1 | 1/2013 | Wickett |
| 2013/0131848 A1 | 5/2013 | Arnone et al. |
| 2013/0190074 A1 | 7/2013 | Arnone et al. |
| 2013/0260869 A1 | 10/2013 | Leandro et al. |
| 2014/0087801 A1 | 3/2014 | Nicely et al. |
| 2014/0087808 A1 | 3/2014 | Leandro et al. |
| 2014/0087809 A1 | 3/2014 | Leupp et al. |
| 2014/0357350 A1 | 12/2014 | Weingardt et al. |
| 2017/0148271 A1 | 5/2017 | Graboyes Goldman et al. |

FOREIGN PATENT DOCUMENTS

| | | |
|---|---|---|
| JP | 2004097610 | 4/2004 |
| JP | 2004166746 | 6/2004 |
| WO | 9851384 | 11/1998 |
| WO | 2010087090 | 8/2010 |

OTHER PUBLICATIONS

U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.

(56) References Cited

OTHER PUBLICATIONS

U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 24, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
International Preliminary Report on Patentability, PCT/US2011/026768, dated Jun. 4, 2012.
International Search Report and Written Opinion, PCT/US2011/026768, dated Apr. 28, 2011.
Changing the Virtual Self: Avatar Transformations in Popular Games; Barr et al., Victoria Univ., NZ, 2006.
Real-Time Multimodal Human-Avatar Interaction; Li et al., IEEE (Video Technology) vol. 18, No. 4, 2008.
itl.nist.gov, Extreme Studentized Deviate Test, [online], Sep. 2010, Internet<URL:http://www.itl.nist.gov/div898/software/dataplot/refman1/auxillar/esd.htm>, entire document, National Institute of Standards and Technology (NIST), U.S. Department of Commerce.
IP Australia, Patent Examination Report No. 1, dated Mar. 23, 2013.
Office action in related Japanese Patent Application No. 2012-556193, dated Feb. 26, 2013.
Supplemental European Patent Office Search Report and Written Opinion dated Jan. 14, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
U.S. Appl. No. 14/815,764 Arnone, et al. filed Jul. 31, 2015.
U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/942,844 Arnone, et al. filed Nov. 16, 2015.
U.S. Appl. No. 14/942,883 Arnone, et al. filed Nov. 16, 2015.
U.S. Appl. No. 14/949,759 Arnone, et al. filed Nov. 23, 2015.
U.S. Appl. No. 14/952,758 Arnone, et al. filed Nov. 25, 2015.
U.S. Appl. No. 14/952,769 Arnone, et al. filed Nov. 25, 2015.
U.S. Appl. No. 14/954,922 Arnone, et al. filed Nov. 30, 2015.
U.S. Appl. No. 14/954,931 Arnone, et al. filed Nov. 30, 2015.
U.S. Appl. No. 14/955,000 Arnone, et al. filed Nov. 30, 2015.
U.S. Appl. No. 14/956,301 Arnone, et al. filed Dec. 1, 2015.
U.S. Appl. No. 14/965,231 Arnone, et al. filed Dec. 10, 2015.
U.S. Appl. No. 14/965,846 Arnone, et al. filed Dec. 10, 2015.
U.S. Appl. No. 14/981,640 Arnone, et al. filed Dec. 28, 2015.
U.S. Appl. No. 14/981,775 Arnone, et al. filed Dec. 28, 2015.
U.S. Appl. No. 14/984,943 Arnone, et al. filed Dec. 30, 2015.
U.S. Appl. No. 14/984,965 Arnone, et al. filed Dec. 30, 2015.
U.S. Appl. No. 14/984,978 Arnone, et al. filed Dec. 30, 2015.
U.S. Appl. No. 14/985,107 Arnone, et al. filed Dec. 30, 2015.
U.S. Appl. No. 14/995,151 Arnone, et al. filed Jan. 13, 2016.
U.S. Appl. No. 14/974,432 Arnone, et al. filed Dec. 18, 2015.
U.S. Appl. No. 14/997,413 Arnone, et al. filed Jan. 15, 2016.
U.S. Appl. No. 15/002,233 Arnone, et al. filed Jan. 20, 2016.
U.S. Appl. No. 15/005,944 Arnone, et al. filed Jan. 25, 2016.
U.S. Appl. No. 15/011,322 Arnone, et al. filed Jan. 29, 2016.
U.S. Appl. No. 15/051,535 Arnone, et al. filed Feb. 23, 2016.
U.S. Appl. No. 15/053,236 Arnone, et al. filed Feb. 25, 2016.
U.S. Appl. No. 15/057,095 Arnone, et al. filed Feb. 29, 2016.
U.S. Appl. No. 15/060,502 Arnone, et al. filed Mar. 3, 2016.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.

(56) References Cited

OTHER PUBLICATIONS

U.S. Appl. No. 14/188,587 Arnone, et al., filed Feb. 24, 2014.
U.S. Appl. No. 15/063,365 Arnone, et al. filed Mar. 7, 2016.
U.S. Appl. No. 15/063,496 Arnone, et al. filed Mar. 7, 2016.
U.S. Appl. No. 15/073,602 Arnone, et al. filed Mar. 17, 2016.
U.S. Appl. No. 15/074,999 Arnone, et al. filed Mar. 18, 2016.
U.S. Appl. No. 15/077,574 Arnone, et al. filed Mar. 22, 2016.
U.S. Appl. No. 15/083,284 Arnone, et al. filed Mar. 28, 2016.
U.S. Appl. No. 15/091,395 Arnone, et al. filed Apr. 5, 2016.
U.S. Appl. No. 15/093,685 Arnone, et al. filed Apr. 7, 2016.
U.S. Appl. No. 15/098,287 Arnone, et al. filed Apr. 13, 2016.
U.S. Appl. No. 15/098,313 Arnone, et al. filed Apr. 13, 2016.
U.S. Appl. No. 15/130,101 Arnone, et al. filed Apr. 15, 2016.
U.S. Appl. No. 15/133,624 Arnone, et al. filed Apr. 20, 2016.
U.S. Appl. No. 15/134,852 Arnone, et al. filed Apr. 21, 2016.
U.S. Appl. No. 15/139,148 Arnone, et al. filed Apr. 26, 2016.
U.S. Appl. No. 15/141,784 Arnone, et al. filed Apr. 29, 2016.
U.S. Appl. No. 15/155,107 Arnone, et al. filed May 16, 2016.
U.S. Appl. No. 15/156,222 Arnone, et al. filed May 16, 2016.
U.S. Appl. No. 15/158,530 Arnone, et al. filed May 18, 2016.
U.S. Appl. No. 15/161,174 Arnone, et al. filed May 20, 2016.
U.S. Appl. No. 15/170,773 Arnone, et al. filed Jun. 1, 2016.
U.S. Appl. No. 15/174,995 Arnone, et al. filed Jun. 6, 2016.
U.S. Appl. No. 15/179,940 Arnone, et al. filed Jun. 10, 2016.
U.S. Appl. No. 15/189,797 Arnone, et al. filed Jun. 22, 2016.
U.S. Appl. No. 15/190,745 Arnone, et al. filed Jun. 23, 2016.
U.S. Appl. No. 15/191,050 Arnone, et al. filed Jun. 23, 2016.
U.S. Appl. No. 15/219,257 Arnone, et al. filed Jul. 25, 2016.
U.S. Appl. No. 15/227,881 Arnone, et al. filed Aug. 3, 2016.
U.S. Appl. No. 15/241,683 Arnone, et al. filed Aug. 19, 2016.
U.S. Appl. No. 15/245,040 Arnone, et al. filed Aug. 23, 2016.
U.S. Appl. No. 15/233,294 Arnone, et al. filed Aug. 24, 2016.
U.S. Appl. No. 15/252,190 Arnone, et al. filed Aug. 30, 2016.
U.S. Appl. No. 15/255,789 Arnone, et al. filed Sep. 2, 2016.
U.S. Appl. No. 15/261,858 Arnone, et al. filed Sep. 9, 2016.
U.S. Appl. No. 15/264,521 Arnone, et al. filed Sep. 13, 2016.
U.S. Appl. No. 15/264,557 Arnone, et al. filed Sep. 13, 2016.
U.S. Appl. No. 15/271,214 Arnone, et al. filed Sep. 20, 2016.
U.S. Appl. No. 15/272,318 Arnone, et al. filed Sep. 21, 2016.
U.S. Appl. No. 15/273,260 Arnone, et al. filed Sep. 22, 2016.
U.S. Appl. No. 15/276,469 Arnone, et al. filed Sep. 26, 2016.
U.S. Appl. No. 15/280,255 Arnone, et al. filed Sep. 29, 2016.
U.S. Appl. No. 15/286,922 Arnone, et al. filed Oct. 6, 2016.
U.S. Appl. No. 15/287,129 Arnone, et al. filed Oct. 6, 2016.
U.S. Appl. No. 15/289,648 Arnone, et al. filed Oct. 10, 2016.
U.S. Appl. No. 15/297,019 Arnone, et al. filed Oct. 18, 2016.
U.S. Appl. No. 15/298,533 Arnone, et al. filed Oct. 20, 2016.
U.S. Appl. No. 15/336,696 Arnone, et al. filed Oct. 27, 2016.
U.S. Appl. No. 15/339,898 Arnone, et al. filed Oct. 31, 2016.
U.S. Appl. No. 15/345,451 Arnone, et al. filed Nov. 11, 2016.
U.S. Appl. No. 14/799,481 Arnone, et al. filed Jul. 14, 2015.
U.S. Appl. No. 15/362,214 Arnone, et al. filed Nov. 28, 2016.
U.S. Appl. No. 15/651,934 Arnone, et al. filed Jul. 17, 2017.
U.S. Appl. No. 15/657,826 Arnone, et al. filed Jul. 24, 2017.
U.S. Appl. No. 15/657,835 Arnone, et al. filed Jul. 24, 2017.
U.S. Appl. No. 15/664,535 Arnone, et al. filed Jul. 31, 2017.
U.S. Appl. No. 15/667,168 Arnone, et al. filed Aug. 2, 2017.
U.S. Appl. No. 15/267,511 Rowe, filed Sep. 16, 2016.
U.S. Appl. No. 15/681,966 Arnone, et al. filed Aug. 21, 2017.
U.S. Appl. No. 15/681,970 Arnone, et al. filed Aug. 21, 2017.
U.S. Appl. No. 15/681,978 Arnone, et al. filed Aug. 21, 2017.
U.S. Appl. No. 15/687,922 Arnone, et al. filed Aug. 28, 2017.
U.S. Appl. No. 15/687,927 Arnone, et al. filed Aug. 28, 2017.
U.S. Appl. No. 15/694,520 Arnone, et al. filed Sep. 1, 2017.
U.S. Appl. No. 15/694,738 Arnone, et al. filed Sep. 1, 2017.
U.S. Appl. No. 15/713,595 Arnone, et al. filed Sep. 22, 2017.
U.S. Appl. No. 15/715,144 Arnone, et al. filed Sep. 25, 2017.
U.S. Appl. No. 15/716,317 Arnone, et al. filed Sep. 26, 2017.
U.S. Appl. No. 15/716,318 Arnone, et al. filed Sep. 26, 2017.
U.S. Appl. No. 15/728,096 Arnone, et al. filed Oct. 9, 2017.
U.S. Appl. No. 15/784,961 Arnone, et al. filed Oct. 16, 2017.
U.S. Appl. No. 15/790,482 Arnone, et al. filed Oct. 23, 2017.
U.S. Appl. No. 15/794,712 Arnone, et al. filed Oct. 26, 2017.
U.S. Appl. No. 15/797,571 Arnone, et al. filed Oct. 30, 2017.
U.S. Appl. No. 15/804,413 Arnone, et al. filed Nov. 6, 2017.
U.S. Appl. No. 15/811,412 Arnone, et al. filed Nov. 13, 2017.
U.S. Appl. No. 15/811,419 Arnone, et al. filed Nov. 13, 2017.
U.S. Appl. No. 15/815,629 Arnone, et al. filed Nov. 16, 2017.
U.S. Appl. No. 15/822,908 Arnone, et al. filed Nov. 27, 2017.
U.S. Appl. No. 15/822,912 Arnone, et al. filed Nov. 27, 2017.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 15/362,660 Arnone, et al. filed Nov. 28, 2016.
U.S. Appl. No. 15/365,628 Arnone, et al. filed Nov. 30, 2016.
U.S. Appl. No. 15/367,541 Arnone, et al. filed Dec. 2, 2016.
U.S. Appl. No. 15/369,394 Arnone, et al. filed Dec. 5, 2016.
U.S. Appl. No. 15/370,425 Arnone, et al. filed Dec. 6, 2016.
U.S. Appl. No. 15/375,711 Arnone, et al. filed Dec. 12, 2016.
U.S. Appl. No. 15/387,117 Arnone, et al. filed Dec. 21, 2016.
U.S. Appl. No. 15/392,887 Arnone, et al. filed Dec. 28, 2016.
U.S. Appl. No. 15/393,212 Arnone, et al. filed Dec. 28, 2016.
U.S. Appl. No. 15/394,257 Arnone, et al. filed Dec. 29, 2016.
U.S. Appl. No. 15/396,352 Arnone, et al. filed Dec. 30, 2016.
U.S. Appl. No. 15/396,354 Arnone, et al. filed Dec. 30, 2016.
U.S. Appl. No. 15/396,365 Arnone, et al. filed Dec. 30, 2016.
U.S. Appl. No. 15/406,474 Arnone, et al. filed Jan. 13, 2017.

(56) References Cited

OTHER PUBLICATIONS

U.S. Appl. No. 15/413,322 Arnone, et al. filed Jan. 23, 2017.
U.S. Appl. No. 15/415,833 Arnone, et al. filed Jan. 25, 2017.
U.S. Appl. No. 15/417,030 Arnone, et al. filed Jan. 26, 2017.
U.S. Appl. No. 15/422,453 Arnone, et al. filed Feb. 1, 2017.
U.S. Appl. No. 15/431,631 Arnone, et al. filed Feb. 13, 2017.
U.S. Appl. No. 15/434,843 Arnone, et al. filed Feb. 16, 2017.
U.S. Appl. No. 15/439,499 Arnone, et al. filed Feb. 22, 2017.
U.S. Appl. No. 15/449,249 Arnone, et al. filed Mar. 3, 2017.
U.S. Appl. No. 15/449,256 Arnone, et al. filed Mar. 3, 2017.
U.S. Appl. No. 15/450,287 Arnone, et al. filed Mar. 6, 2017.
U.S. Appl. No. 15/456,079 Arnone, et al. filed Mar. 10, 2017.
U.S. Appl. No. 15/457,827 Arnone, et al. filed Mar. 13, 2017.
U.S. Appl. No. 15/458,490 Arnone, et al. filed Mar. 14, 2017.
U.S. Appl. No. 15/460,195 Arnone, et al. filed Mar. 15, 2017.
U.S. Appl. No. 15/463,725 Arnone, et al. filed Mar. 20, 2017.
U.S. Appl. No. 15/464,282 Arnone, et al. filed Mar. 20, 2017.
U.S. Appl. No. 15/465,521 Arnone, et al. filed Mar. 21, 2017.
U.S. Appl. No. 15/470,869 Arnone, et al. filed Mar. 27, 2017.
U.S. Appl. No. 15/473,523 Arnone, et al. filed Mar. 29, 2017.
U.S. Appl. No. 15/483,773 Arnone, et al. filed Apr. 10, 2017.
U.S. Appl. No. 15/489,343 Arnone, et al. filed Apr. 17, 2017.
U.S. Appl. No. 15/491,617 Arnone, et al. filed Apr. 19, 2017.
U.S. Appl. No. 15/583,295 Arnone, et al. filed May 1, 2017, 2017.
U.S. Appl. No. 15/589,780 Arnone, et al. filed May 8, 2017.
U.S. Appl. No. 15/597,123 Arnone, et al. filed May 16, 2017.
U.S. Appl. No. 15/597,812 Arnone, et al. filed May 17, 2017.
U.S. Appl. No. 15/599,590 Arnone, et al. filed May 19, 2017.
U.S. Appl. No. 15/605,688 Arnone, et al. filed May 25, 2017.
U.S. Appl. No. 15/605,705 Arnone, et al. filed May 25, 2017.
U.S. Appl. No. 15/626,754 Arnone, et al. filed Jun. 19, 2017.
U.S. Appl. No. 15/631,762 Arnone, et al. filed Jun. 23, 2017.
U.S. Appl. No. 15/632,478 Arnone, et al. filed Jun. 26, 2017.
U.S. Appl. No. 15/632,479 Arnone, et al. filed Jun. 26, 2017.
U.S. Appl. No. 15/632,943 Arnone, et al. filed Jun. 26, 2017.
U.S. Appl. No. 15/632,950 Arnone, et al. filed Jun. 26, 2017.
U.S. Appl. No. 15/641,119 Arnone, et al. filed Jul. 3, 2017.

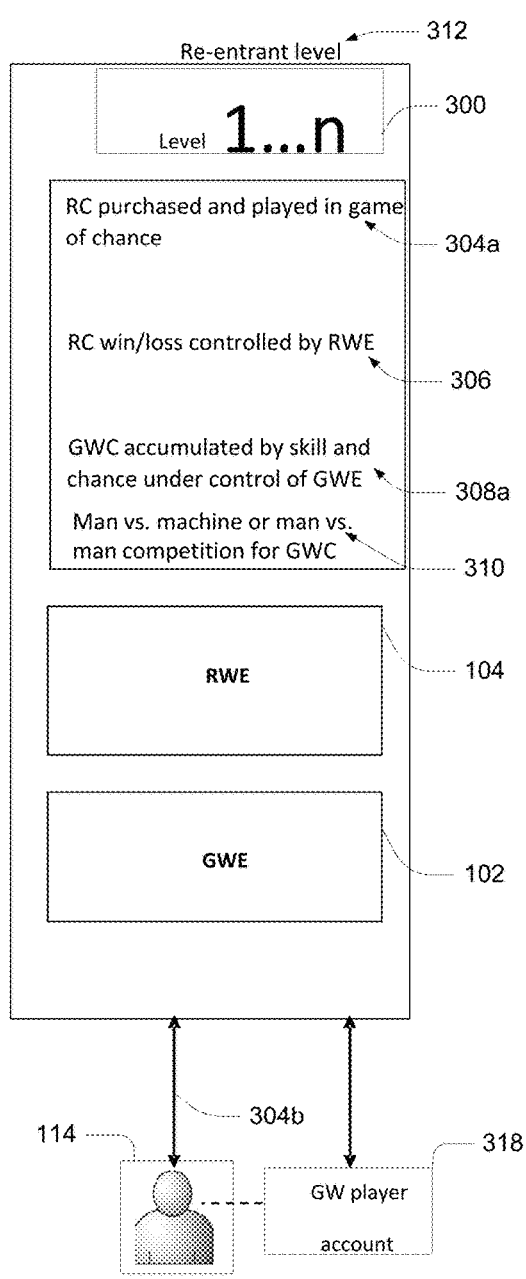
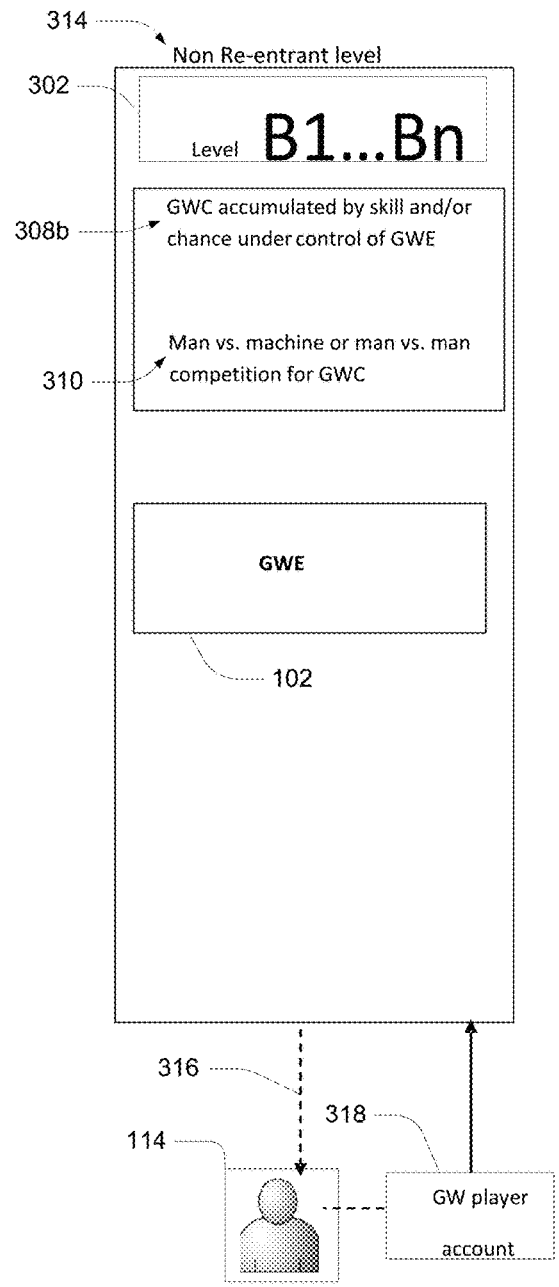
Fig. 3a
Fig. 3b

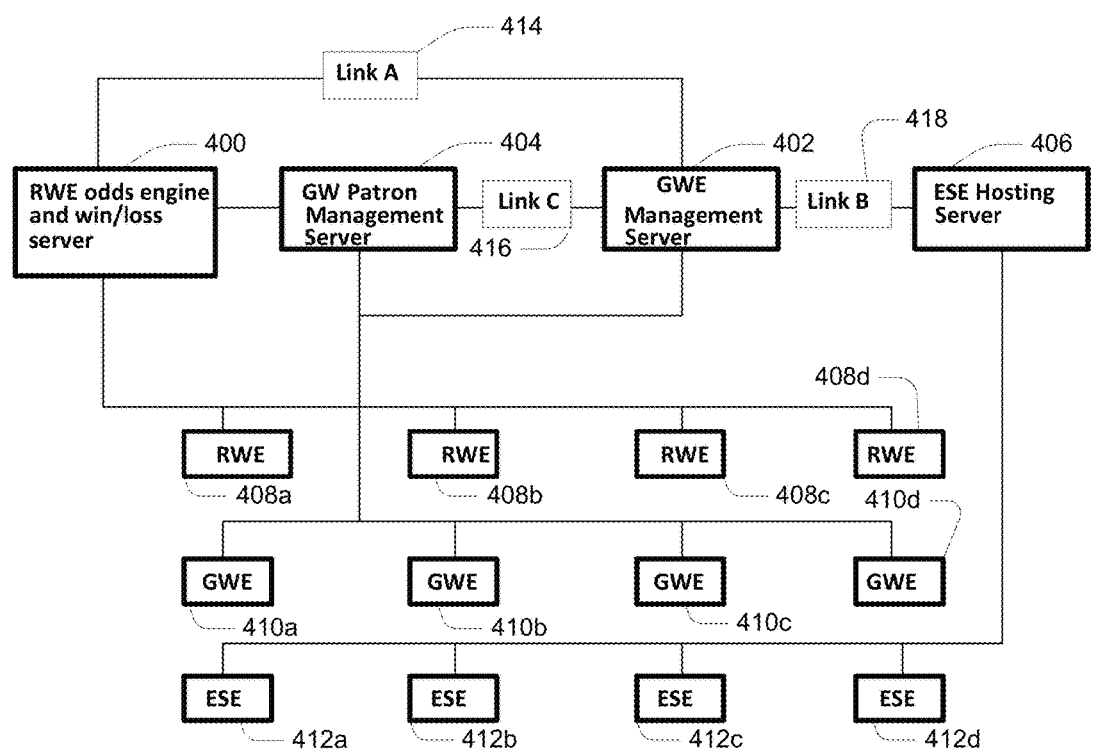

ENRICHED GAME PLAY ENVIRONMENT

CROSS REFERENCE TO RELATED APPLICATIONS

The present application is a continuation of U.S. patent application Ser. No. 15/252,190, filed on Aug. 30, 2016, which is a continuation of U.S. patent application Ser. No. 14/536,231, filed on Nov. 7, 2014 (now U.S. Pat. No. 9,430,902 issued Aug. 30, 2016), which is a continuation of U.S. patent application Ser. No. 14/135,562, filed on Dec. 19, 2013 (now U.S. Pat. No. 8,882,586 issued Nov. 11, 2014), which is a continuation of U.S. patent application Ser. No. 13/582,408, filed Sep. 26, 2012, (now U.S. Pat. No. 8,632,395 issued Jan. 21, 2014) which is a national stage application of Patent Cooperation Treaty Application No. PCT/US2011/026768, filed Mar. 1, 2011, which claims the benefit of U.S. Provisional Patent Application No. 61/339,187, filed Mar. 1, 2010, U.S. Provisional Patent Application No. 61/343,312, filed Apr. 27, 2010, U.S. Provisional Patent Application No. 61/397,630, filed Jun. 15, 2010 and U.S. Provisional Patent Application No. 61/401,891, filed Aug. 20, 2010, the contents of each of which are incorporated by reference as if stated in full herein. U.S. patent application Ser. No. 14/135,562, filed on Dec. 19, 2013 (now U.S. Pat. No. 8,882,586 issued Nov. 11, 2014), is a continuation of U.S. application Ser. No. 13/849,458, filed Mar. 22, 2013, which is a continuation of U.S. patent application Ser. No. 13/600,671, filed Aug. 31, 2012 (now U.S. Pat. No. 8,475,266, issued Jul. 2, 2012), which is a continuation of Patent Cooperation Treaty Application No. PCT/US2011/026768, filed Mar. 1, 2011, which claims the benefit of U.S. Provisional Patent Application No. 61/339,187, filed Mar. 1, 2010, U.S. Provisional Patent Application No. 61/343,312, filed Apr. 27, 2010, U.S. Provisional Patent Application No. 61/397,630, filed Jun. 15, 2010 and U.S. Provisional Patent Application No. 61/401,891, filed Aug. 20, 2010, the contents of each of which are incorporated by reference as if stated in full herein.

FIELD

Embodiments of the present invention relate generally to games of chance and more particularly to games of chance where the user's interaction with the game includes a rich gaming experience, such as by engaging the player by letting the player compete directly with a gaming machine device.

BACKGROUND

The gaming machine manufacturing industry provides a variety of gaming machines for the amusement of gambling players. An exemplary gaming machine is a slot machine. A slot machine is an electro-mechanical game wherein a random number generator determines the outcome of a gambling game, and this, coupled with the betting decisions of a player, results in a specific payout. Slot machines are usually found in casinos or other more informal gaming establishments.

Games involving random outcomes for gambling games and games having a player skill component have been combined. For example, U.S. Patent Application Publication No. 2005/0239538 A1 discloses a gaming apparatus that includes a video game unit, a gambling game unit and a game interface unit. The game interface unit controls the playing of the video game unit based on the playing of the gambling game unit. The gaming apparatus is further configured to pay winnings to a player playing the gaming apparatus based on signals from the game interface unit.

U.S. Patent Application Publication No. 2008/0108425 A1 discloses a gaming device that enables players to play an interactive game and make wager components that occur during the interactive game, where the wagering outcome for each of the wager components is independent from the interactive game. The interactive game is a skill based game initiated by the player. The player funds the gaming machine and during play of the interactive game, upon the occurrence of a wager triggering event, the gaming machine causes a wagering event to occur. The wagering event includes a placement of a wager component and a random determination of a wagering outcome for that wagering event.

U.S. Patent Application Publication No. 2010/0056247 A1 discloses a gaming device that includes a game or game event having an element of strategic skill. The game or game event enables a player to make strategic choices or decisions that have a direct impact on the player's chance of obtaining one or more outcomes or awards in a play of a game.

U.S. Pat. No. 7,326,115 discloses a gaming machine having a first interactive game requiring one or more player inputs. The player inputs result in one or more outcomes. The outcomes do not result in a monetary or other valuable award provided to the player. Rather, a second wagering game is always provided to the player where the player can obtain or has a chance to obtain a monetary or other valuable award.

U.S. Patent Application Publication No. 2009/247272 discloses a gaming machine having a display which arranges a plurality of symbols in a matrix of arrangement areas. The gaming machine provides a base game and a plurality of feature games using the display by rearranging the plurality of symbols in the arrangement areas in the base game, awards a base payout in accordance with a relation among the symbols rearranged in the arrangement areas, awards a feature game which corresponds to the number of predetermined symbols rearranged in the arrangement areas, performs the feature game and awards a bonus payout in accordance with a result of the feature game.

U.S. Pat. No. 5,718,429 discloses a game in which people may place a stake in a casino game and win a cash prize in a skill game. Stakes in the casino game are placed with chips, which may be purchased in exchange for the services of conducting the casino game. A winning stake is rewarded with a token, rather than with money. A token may be exchanged for an opportunity to demonstrate a skill in the skill game. Those that successfully demonstrate the skill are awarded cash or other prize.

U.S. Pat. No. 5,785,592 discloses an interactive target game system for one or more players which may include a vehicle on which a player may ride over a predetermined pathway in a defined area (or the player may walk.) The game includes at least one designator, holdable by a player for aiming at a target and operating to simulate shooting at the target, and at least one target disposed in proximity to the pathway. An indicator device responds to the designator being accurately aimed at the target and operated, for producing an indication of a "hit" or score. The targets may include opportunities to play a game of chance.

U.S. Patent Application Publication No. 2004/0121839 discloses a gaming apparatus operable by a player to simulate a card game in which a hand of cards is dealt to the player. The gaming apparatus displays an image of a player hand including at least one obscured card when first dealt, and modifies the display image data in accordance with player instructions received by the input means, to cause the created image to reveal each obscured card in a manner determined by the player.

SUMMARY

In an embodiment, a gaming machine includes a game world engine having a game world user interface, and a real world engine including a real world user interface and a random number generator. The game world engine is constructed to provide, via the game world interface to a player, an entertainment game including a plurality of levels, generate a trigger based on a player action of the player using an enabling element of the entertainment game during the player's play of the entertainment game, accumulate game world credit for the player based on the player's use of the enabling element, determine a progress from a first level of the plurality of levels of the entertainment game to a second level of the plurality of levels of the entertainment game on the basis of the game world credit, and select a level real world credit play table on the basis of the progress from the first level of the plurality of levels of the entertainment game to the second level of the plurality of levels of the entertainment game. The real world engine is constructed to receive via the real world user interface, real world credits input by the player, receive the trigger from the game world engine, and execute in response to the trigger, a gambling game to determine a gambling outcome using the random number generator, the level real world credit pay table, and a wager of an amount of the real world credit.

In some embodiments, a gaming machine includes a real world user interface, a game world user interface, and a random number generator. A processor is coupled to the real world user interface, game world user interface, and random number generator, and the processor is further coupled to a processor-readable storage media storing processor-executable instructions that when executed by the processor cause the processor to receive, via the real world user interface, real world credits input by a player, provide, via the game world interface, an entertainment game wherein the entertainment game has a plurality of levels, trigger execution of a gambling game to determine a gambling outcome using the random number generator, a first level real world credit pay table, and a wager of an amount of the real world credit in response to a player action of the player using an enabling element of the entertainment game during the player's play of the entertainment game, wherein the first level real world pay table is associated with a first level of the plurality of levels of the entertainment game, accumulate game world credit for the player based on the player's use of the enabling element, determine a progress from a first level of the plurality of levels of the entertainment game to a second level of the plurality of levels of the entertainment game on the basis of the game world credit, and select a second level real world credit play table on the basis of the progress from the first level of the plurality of levels of the entertainment game to the second level of the plurality of levels of the entertainment game.

In various embodiments, a method of a gaming machine is provided. The method includes receiving, via a real world user interface, real world credits input by a player, providing, via a game world interface, an entertainment game comprising a plurality of levels, triggering execution of a gambling game to determine a gambling outcome using a random number generator, a first level real world credit pay table, and a wager of an amount of the real world credit in response to a player action of the player using an enabling element of the entertainment game during the player's play of the entertainment game, wherein the first level real world pay table is associated with a first level of the plurality of levels of the entertainment game, accumulating game world credit for the player based on the player's use of the enabling element, determining a progress from a first level of the plurality of levels of the entertainment game to a second level of the plurality of levels of the entertainment game on the basis of the game world credit, and selecting a second level real world credit play table on the basis of the progress from the first level of the plurality of levels of the entertainment game to the second level of the plurality of levels of the entertainment game.

In some embodiments, the entertainment game is a video game.

In various embodiments, the video game is a road racing game.

In many embodiments, the video game is a marksmanship game.

In some embodiments, the video game is a boxing game.

In another embodiment, the video game is a first person shooter game.

In yet another embodiment, the video game is a board game.

In some embodiments, the video game is a strategy game.

BRIEF DESCRIPTION OF THE DRAWINGS

These and other features, aspects, and advantages will become better understood with regard to the following description, appended claims, and accompanying drawings where:

FIGS. 3A and 3B are architecture diagrams of exemplary enriched game play environments;

FIG. 4 is a system diagram of an exemplary large scale gaming system;

DETAILED DESCRIPTION

Terminology

Figure 1:
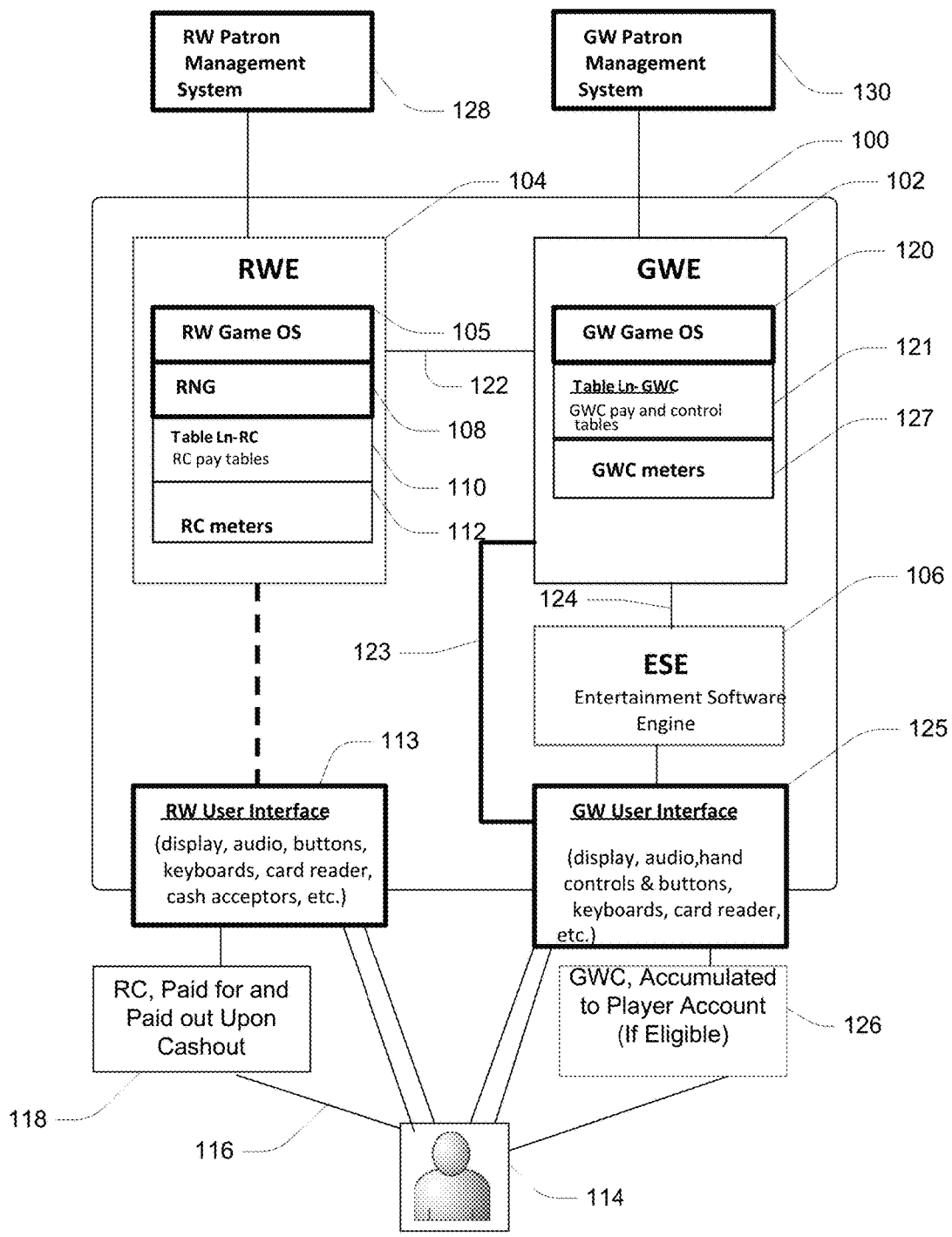
FIG. 1 is a diagram illustrating exemplary architecture of a gaming system and the interaction between three primary systems of a Game World Engine (GWE), a Real World Engine (RWE) and an Entertainment Software Engine (ESE)

"Casino". A gaming establishment in either one or a plurality of locations where people go to play gambling games of chance. Casino may also refer to a virtual manifestation of a casino, such as an on-line casino or gambling operation.

"Casino Operator", or "Operator". A person or entity which operates one or more gambling operations, including but not limited to a Wide Area Network gaming franchise, a gaming route, or other gambling business be it a physical manifestation in the case of a casino or virtual in the case of an Internet gambling operation.

"ESE" Entertainment Software Engine. The electrical components and software that control the playing of video games for entertainment. The ESE accepts input from a player through a set of hand controls and outputs video, audio and/or other sensory output to a user interface. A Personal Computer (PC), Sony PlayStation® or Microsoft Xbox® running a specific game program (e.g. a version of Madden Football '10 ®) are typical examples of an ESE. The ESE exchanges data with and accept control information from a GWE.

"EE" Enabling Element. The consumable and replenishable elements in an entertainment game that enable a player to play the entertainment game while consuming the element. There may be one or more enabling element types within use in the gaming system, either simultaneously or serially. Enabling element types include, but are not limited to, bullets, fuel, health points, potions, etc. to be used when playing an entertainment game.

"Slot" or "Slot Machine". An electro-mechanical game wherein a random number generator determines the chance of outcome of a game, and coupled with the betting decisions of a player, a gambling outcome results. Slot machines are usually found in casinos or other more informal gaming establishments.

"GW" Game World. The entertainment portion of a game and information typically associated with virtual entertainment environment, including its game characters, progress points and scores. Typical games played on a Sony PlayStation® console are examples of GWs.

"RW" Real World. The Slot Machine style portion of a game, which may or may not include an entertainment portion of its own, but whose fundamental operation is enabled by real funds, accretes and decrements real gambling credits based on random gambling outcome, and whose gambling proposition is typically regulated by gaming control bodies. The fundamentals of the mechanisms of play of a Slot Machine are examples of a RW.

"RC" Real-world Credit. These credits are analogous to slot machine game credits which are entered into a RW game by the user, either in the form of hard currency or electronic funds. RCs are decremented or augmented based on the outcome of a random number generator according to the Table Ln-Rc real world credits pay table, independent of player skill. In one aspect, a certain amount of RC would be required to enter higher ESE game levels. RC can be carried forward to higher game levels or paid out if a game cash out is opted for by player. The amount of RC required to enter a specific level of the game "Level n" need not be the same for each level.

"Table Ln-Rc" Level n Real-world Credit Pay Table. This is the table used in conjunction with a random number generator to dictate the RC earned as a function of game play and is analogous to the pay tables used in a conventional slot machine. Table Ln-Rc payouts are independent of player skill. There may be one or a plurality of Table Ln-Rc pay tables included in a game design, the selection of which being determined by game progress a player has earned, and bonus rounds which a player may be eligible for.

"GWC" Game World Credits. Game World Credits are player points earned or depleted as a function of player skill, i.e. as a function of player performance in the context of the game. GWC is analogous to the "score" in a typical video game. Each game has a scoring criterion, embedded within the Table Ln-GWC that reflects player performance against the goal(s) of the game. GWC can be carried forward from one level of game play to another, and ultimately paid out in various manners such as directly in cash, or indirectly such as earning entrance into a sweepstakes drawing, or earning participation in, or victory in, a tournament with prizes. GWC may be stored on a player tracking card or in a network-based player tracking system and the GWC is attributed to a specific player.

"Table Ln-GWC" Level n Game World Credit Pay Table. This is the table that dictates the GWC earned as a function of player skill in the nth level of the game. The payouts governed by this table are dependent upon player skill and game play at large and may or may not be coupled to a random number generator.

"Level 1". Any player may begin game play at Level 1. Entry to level 1 requires loading of RC into the game. There is no GWC required to enter level 1.

"Re-entrant Level n" (where n>2). Players can re-enter the game at level 'n' if they have accumulated adequate GWC to enter the level. A specific GWC hurdle is established for each Level, with GWC>0 allowing entry into Level 1. The GWC hurdle for each level n may be the same or can increase as a function of each level.

"Level B1". When a certain level of GWC is obtained by the player, game play proceeds to a non-re-entrant level, "Level B1". Level B1 commences a series of levels from B1 to Bn where re-entry is no-longer possible and where game play may be exclusively skill based or a combination of skill and chance. Game-play continues as the player advances through the B levels until such time as the player either cashes out their RC, all RC has been consumed, a player has exhausted their GWC through play, or a player has exhausted their game character's lives, energy or other necessary element required for the character to survive within the game environment. A player cashing out in the B levels can re-enter the game at the highest re-entrant level, "level n".

"Level Bn" Additional non-re-entrant levels that are only accessed by completing Level B(n−1) with adequate GWC.

"User Interface" or "UI". The means by which the game conveys information to the player. This includes visual and audio components, and any other input/output used to communicate with the player, exclusive of collecting and disbursing GC and RC.

"User Controls". The means by which the user interfaces with the game (e.g. wheels, buttons, pistols, levers). It does not include the means of collecting and disbursing RC and GWC.

"GWE". Game World Engine. The portion of a game which primarily manages the GW portion of the game and includes the mechanical, electronic and software constructs to (a) provide control of the GW portion of the game, (b) include Table Ln-GWC and to take input from this table to affect the play of the GW portion of the game, (c) couple to the RWE to determine the amount of RC available on the game and other metrics of wagering on the RW portion of the game, and potentially affect the amount of RC in play on the RWE, (d) include various audit logs and activity meters, (e) couple to a centralized server for exchanging various data related to the player and their activities on the game, (f) couple to the ESE.

"RWE". Real World Engine. The portion of a game which primarily manages the RW portion of the game and includes the mechanical, electronic and software constructs to (a) provide control of the RW portion of the game, (b) include Table Ln-RC and to take input from this table to affect the play of the RW portion of the game, (c) couple to the GWE to communicate the amount of RC available on the game, (d) communicate other metrics of wagering to the GWE, (e) accept input from the GWE as to the amount of RC in play, (f) accept signaling from the GWE in order to trigger the actual execution of an RW gambling play, (g) include various audit logs and activity meters, (h) couple to a centralized server for exchanging various data related to accounting of the gambling proposition, the player and their wagering activities on the game.

"Cheats". Game performance modifiers, enhancing the visual and entertainment piece of the game, the GWC, and the Table Ln-GWC. Cheats may be entered by a player through the User Interface at various points in the game progression based on their GWCs and the game level they are operating at. The game design may charge a player some of their GWC in order to enable a Cheat. In the gaming system, Cheats only effect on the RW gambling proposition would be to alter the amount of RC in play on each gambling game of the RWE, and beyond this would have no effect on RC, the Table Ln-Rc or any other aspect of the real world gambling proposition. An example of a Cheat would be to enable a special gun in the game which shoots unique ammunition, or a car with an extra super-charger.

"RNG" Random Number Generator. A software and/or hardware algorithm and/or process which is used to generate random outcomes.

FIG. 1 illustrates an architecture of a gaming system 100 used to implement a game and interaction between three systems, a GWE 102, an RWE 104 and an ESE 106. The RWE includes the fundamental operating system 105 for the RW portion of the game and controls and operates a gambling proposition. The RWE includes an RNG 108, pay tables (Table Ln-RC) 110, RC meters 112 and other hardware and software constructs used for the RW portion of the game to offer a fair and transparent gaming proposition, and to include the auditable systems and functions necessary for the game to obtain gaming regulatory body approval.

The RWE encompasses many components of a slot machine, such as a RW user interface 113 for inputting and displaying game parameters to a player 114, but may or may not include an entertainment front end. The RWE accepts a trigger to run the gambling proposition in response to actions taken by the player 114 in the GW as conveyed by the ESE to the GWE, or as triggered by the GWE based on its own algorithms. The RWE may or may not provide background to the overall game from the player's perspective, but does provide information to the GWE to expose the player to certain aspects of the gaming proposition, such as odds, amount of RC in play, amount of RC 118 available, etc. The RWE accepts modifications 116 in the amount of RC 118 wagered on each individual gambling try, or the number of games per minute the RWE would execute, entrance into a bonus round, and other factors, all the while these factors and the choices from the player's perspective taking a different form than that of a typical slot machine.

An example of a varying wager amount that the player would choose might be that they have decided to play the entertainment game using various types of EE in the GW, such as a more powerful character in the game, or having a more powerful gun, a better car, etc. These choices may increase or decrease the amount wagered per individual RWE gambling game, in the same manner that a standard slot machine player may decide to wager more or less credits for each pull of the handle. The RWE communicates a number of factors back and forth to the GWE, as discussed below, via their interface, such increase/decrease in wager being a function of the player's decision making as to their operational profile in the GW (i.e. power of the character, gun selection, car choice, etc.). In this manner, the player is always in control of the per game wager amount, with the choice mapping to some parameter or component which is applicable to the GW experience that is the entertainment piece for the game. An example of the RWE operation would be a game of chance running, say every 10 seconds, the amount wagered being communicated from the GWE as a function of choices the player makes in the operation profile in the GW such as those cited above.

The GWE 102 includes a GW operating system 120 and manages the overall game operation, with the RWE 104 and the ESE 106 effectively being support units to the GWE. The GWE further includes Ln-GWC tables 121 and GWC meters 127 and other hardware and software constructs used for guiding and tracking the accumulation of GWC of player 114 while playing an entertainment game. It is noted that in the case of the RWE in this arrangement, no operation of the GWE affects the RWE's gambling operation except for player choice parameters that are allowable in slot machines today, such as the wager amount, how fast the player wants to play (by pressing a button or pulling the slot's handle), agreement to wager into a bonus round, etc. In this sense, the RWE provides a fair and transparent, non-skill based gambling proposition co-processor to the GWE. A communication link 122 between the GWE and the RWE is for the purposes of the GWE obtaining information from the RWE as to the amount of RC 118 available on the RW portion of the game, and necessary status operation of the RWE (such as on-line or tilt), and for the GWE to communicate to the RWE the various gambling control factors which the RWE uses as input, such as the number of RC consumed per game or the player's election to enter a jackpot round. The GWE is also connected (123) to a player's user GW interface 125 directly, as this may be necessary to communicate certain GW club points, player status, control the selection of choices and messages which a player may require in order to adjust their GW experience or understand their gambling status in the RWE.

The GWE 102 also connects to the ESE 106. The ESE manages and controls the visual, audio and player control entertainment for the GW game. The ESE operates mostly independently from the GWE, except that via their interface 124, the GWE may send certain GW game control parameters to the ESE to affect its play, such as what level of character to be using, changing the difficulty level of the game, changing the type of gun or car in use, requesting potions to become available or to be found by the character, etc. The ESE accepts this input from the GWE, makes adjustments, and continues the play action all the while running seamlessly from the player's perspective. The ESE's operation is mostly skill based, except for where the ESE's algorithm may inject complexities into the game by chance in its normal operation to create unpredictability in the GW game and the like. Utilizing this interface, the ESE may also communicate player choices made in the game to the GWE, such as selection of a different gun, the player picking up a special potion in the GW environment, etc. The GWE's job in this architecture, being interfaced thusly to the ESE, is to allow the transparent coupling of entertainment software to a fair and transparent random chance gambling game, providing a seamless perspective to the player that they are playing a typical popular entertainment and skill based game. For example, the ESE described herein could be used to enable a wide range of games including popular titles from arcade and home video games (e.g. Gears of War®, Time Crisis®, Madden Football®, etc.). Providers of such software provide the previously described interface by which the GWE requests amendments to the operation of the ESE software, in order to provide the seamless and sensible operation of the gaming system as both a RW gambling and entertainment machine.

A feature of this architecture is that a video game style gambling machine can be implemented, where the gambling portion of the game (i.e. RWE 104 and RC 118) is not player skill based, while at the same time allows players to use their skills to earn club points which a casino operator can translate to rewards, tournaments opportunities and prizes for the players. The actual exchange of monetary funds earned or lost directly from gambling against a slot machine is preserved, while at the same time a rich environment of rewards to stimulate "garners" can be established.

Another feature of the architecture is that it leverages very popular titles with "garners" and provides a sea change environment for casinos to attract players with games that are more akin to the type of entertainment which a younger generation desires.

An additional feature of the architecture is that players could use their skill towards building and banking GWC 126 which in turn could be used to win tournaments and various prizes as a function of their "garners" prowess.

Another feature of this architecture is that it minimizes the underlying changes needed to the aforementioned entertainment software (Gears of War®, etc.), for it to operate within the gaming construct, thus making a plethora of complex game titles and environments, rapid and inexpensive to deploy in a gambling environment.

The architecture of FIG. 1 may be physically accomplished as shown literally, or may be more virtual in nature. For example, a single or a plurality of processing apparatuses, computing devices or controllers may divide up the logical tasks reflected, the user interfaces shown could be combined to a single or plurality of display screens, player feedback and controls. In addition, connections shown to the RW patron server 128 and the GW patron management server 130 for the purposes of game accounting, RC and GWC tracking and other functions could be a single connection to a single server, a single connection to a plurality of servers, multiple connections to multiple servers, etc., such that the system could be accomplished in a highly virtualized space, such that the RWE 104 and GWE 120 were large scale centralized servers "in the cloud" coupled to a plurality of widely distributed ESE controllers, such as ESE 106, or clients via the Internet.

Figure 2:
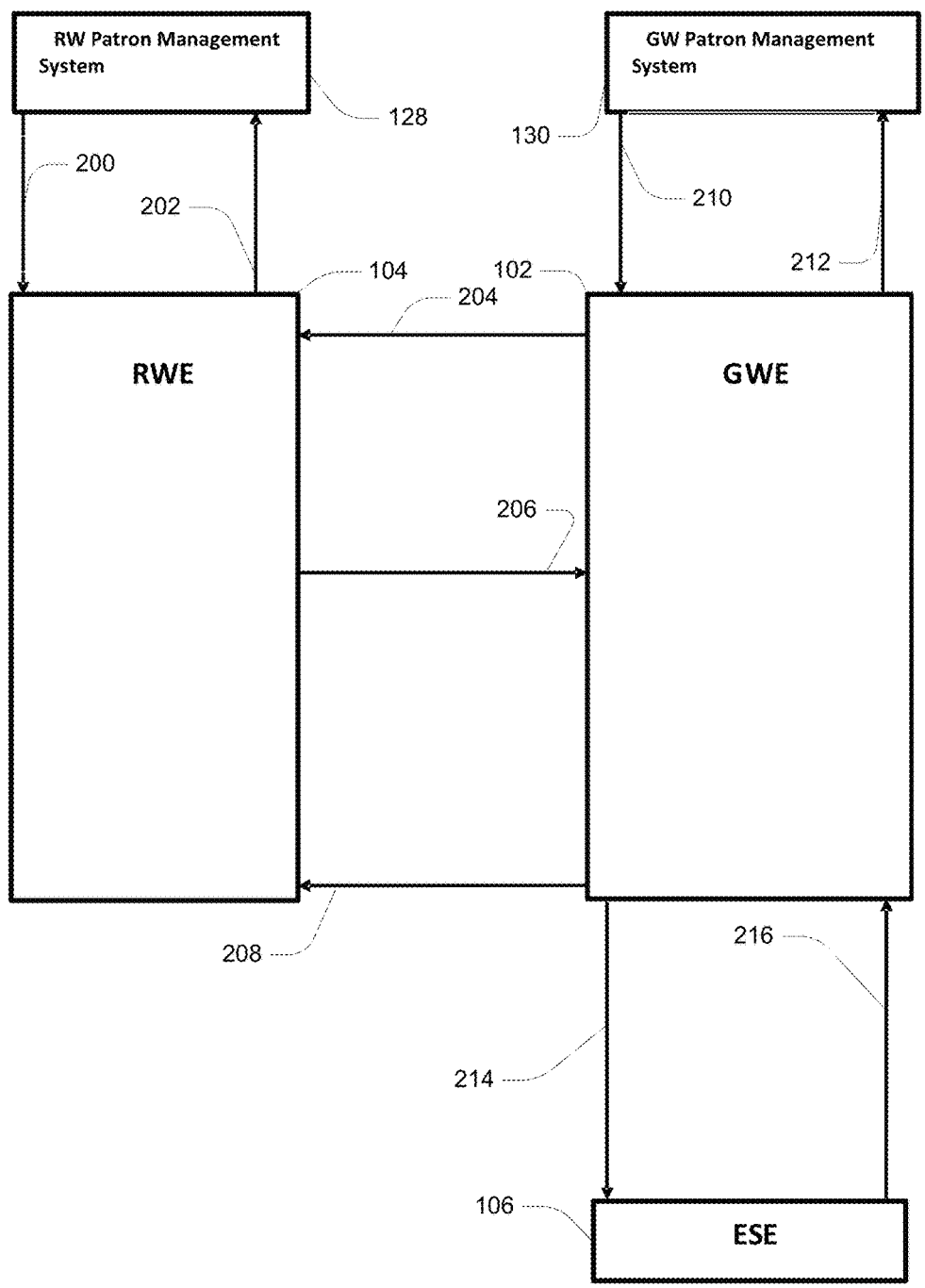
FIG. 2 is a data flow diagram illustrating exemplary data flow between Real World (RW) and Game World (GW) patron management systems, an RWE, a GWE and an ESE.

FIG. 2 is a data flow diagram illustrating exemplary data flow between a RW patron management 128 and GW Patron management systems 130, an RWE 104, a GWE 102 and an ESE 106. The examples of communications flow in FIG. 2 are not intended to be exhaustive or all inclusive, but rather serve as practical examples of the kinds of data exchanged over the interfaces.

The RWE 104 is connected to a RW patron management system 128. The RW patron management system sends parameters 200 to the RWE, such as a Ln-RC tables, max speed of play, game monetary denmon and casino promotion RC. The RWE sends parameters 202 to the RW patron management system, such as the RC on the game, RW player account information and player activity and profiles.

The RWE 104 is further connected to the GWE 102 and receives triggers 204 for a gambling game.

The RWE 104 transmits parameters and objects 206 to the GWE 102, such as status of the RWE, a gambling play result, Ln-RC table information, RW patron management system data, whether or not it is possible to enter a bonus round, the game monetary denmon and other RWE parameters.

The GWE 102 also transmits parameters and objects to the RWE 104, such as the RC to play per RWE game, whether to enter or decline a bonus round, casino promotional RC and audit information. The audit information includes a GWE title, profile and status, Ln-GWC table information, GWC points and audit information, and player and profile information.

The GWE 102 is also connected to the GW patron management system 130 and receives parameters 210 such as game title and type, tournament information, Ln-GWC tables, special offers, character and profile setups, and synchronization information.

The GWE 102 transmits to the GW patron management system 130 parameters 212 such as GWC and RC on a game, GW and RW player account information, play activity and profile, and synchronization information.

The GWE 102 is also connected to the ESE 106 and transmits parameters and objects 214 such as ESE game software, difficulty settings, game score enhancements, cheats, character profiles and setups, equipment inventory, random complexity modifications, changes in the GW character's status in the game, etc.

The GWE 102 receives from the ESE 106 parameters 216 such as player choices chosen through a UI, GW character profiles, GW equipment and inventory, game scores, random complexity ratings, language selection, tournament and multiplayer information, etc.

Referring now to FIGS. 3A and 3B, where like identifiers refer to the same element, FIGS. 3A and 3B are architecture diagrams of enriched game play environments. Game play consists of a series of levels, 1 to n 300, and B1 to Bn 302. In levels 1 through n, RC 304b is paid (304a) by the player 114 to play a game of chance, the payout for which is dictated (306) by a Table Ln-RC of the RWE 104. GWC is accumulated (308a) as a function of player skill in accordance with Table Ln-GWC of the GWE 102 at each level where the player 114 may play (310) against a machine or another player. The player can progress from level 1 through level n by hitting certain GWC thresholds.

In another aspect, the player 114 may be required to pay a requisite amount of RC 304b to gain entry to the levels. The RC and GWC tables, as well as the amount of RC needed to play the game of chance at each level, can be set independently for each of the n levels.

The re-entrant levels 312 serve to indicate the player 114 can cash in at a later time, or cash out their RC after any given RW game play, while GWC is accumulated or decremented over time as a function of player achievement relative to the GWC tables and play performance in the ESE (not shown). GWC is attributed to a specific player through a player account 318, accessed by a player card, account number or other means, and is essentially the "gamers" bank account so far as GWC goes.

Players that progress through Level n by achieving adequate GWC gain access to level B1 302. Levels B1 through Bn are non-re-entrant 314 levels. Players that choose to participate in the non-re-entrant portion of the game may be given the opportunity to cash out (316) their GWC as a function of subsequent game play and/or based upon casino promotional or incentive programs for the player. The non-re-entrant levels may or may not include payouts based on chance, i.e. Table LBn-RC may not provide for any payout, with all the player's prospective payout being dictated by Table LBn-GWC in such a case.

In one aspect, once the player 114 enters Level B1, they cannot add to their GWC except through game play (308*b*) in level B1 through Bn. The non-re-entrant levels of the game need not be accessed contiguously. Game play can be paused and resumed for various reasons (e.g. sleep), such pause-and-resume function not impacting GWC or player status in the game in any way.

The gaming system also subsumes the case where game play includes only levels 1-n 300, and that there is no level B1 or beyond. In this case, there is no prospect of a payout based upon GWC (i.e. skill), except as may be granted by the casino as a function of a promotion or marketing program.

FIG. 4 is a system diagram of an exemplary large scale gaming system. Pictured are four main servers, a centralized RWE win/loss server 400, a GWE management server 402, a GWE patron management server 404 and an ESE hosting server 406. The RWE win/loss server is connected to a plurality of RWEs, such as RWEs 408*a* to 408*d*. The GW patron management server and GW management server are connected to a plurality of GWEs, such as GWEs 410*a* to 410*b*. The ESE hosting server is connected to a plurality of ESEs, such as ESEs 412*a* to 412*d*. Each these servers are also joined by links to another server, such as Link A 414, Link B 416 and Link C 418.

In operation, RWE odds engine and win/loss server 400 hosts a centralized odds engine that generates random outcomes (win/loss) for a plurality of games thereby eliminating the need to have an individual RWE included in each game. The RWE odds engine and win/loss server 404 server performs a number of simultaneous, or pseudo-simultaneous runs in order to generate random outcomes for a variety of odds percentages that the overall system may require. This is for the purposes of efficiency of the overall system and may be optional in the system if a discrete RWE is included in each game.

The GWE management server 402 networks all the discrete GWEs, such as GWEs 410*a* to 410*d* included in the games. The GWE provides a method for monitoring high scores on select groups of games, links groups of games in order to join them in head to head tournaments, and acts as a tournament manager. More detail on how tournament linking and management is accomplished is provided in the Link B 418 and other descriptions below.

The GWE patron management server 404 manages player account information, including but not limited to data concerning players' characters, players' game scores, players' RC and GWC, managing tournament reservations, etc.

The ESE hosting server 406 provides a host for managing head-to-head play, operating on the network of ESEs which are connected to it, such as ESEs 412*a* to 412*d*, by providing an environment where players can compete directly with one another and "see" the other players. This server operates in a manner consistent with multi-player or massively multi-player game servers that in turn interface with game consoles, be it a Sony PlayStation®, personal computer, Microsoft Xbox®, etc.

Link A 414 signals between the GWE management server 402 and the RWE win/loss server 400 (should this optional RWE server exist). Information communicated on this link includes configuring the various simultaneous or pseudo simultaneous odds engines executing in parallel within the RWE to accomplish the system requirements, metrics of RWE performance such as random executions run and outcomes for tracking system performance, performing audits, providing Operator reports, etc., and requesting the results of a random run win/loss result for use of function operating within the GWE, such as automatic drawings for prizes are a function of ESE performance (see later section on "Secondary Drawings").

Link B 418 provides for signaling between the GWE management server 402 and the ESE hosting server 406. Various information is communicated on this link, including but not limited to configuring tournaments according to system programming conducted by the operator; allowing entry of a particular game into a tournament; communicating the number of players in a tournament and the status of the tournament, be it the amount of surviving players, their status within the game, time remaining on the tournament, etc.; communicating the status of an ESE included in a game and the performance of its character(s) within the tournament; communicating the scores of the various members in the tournament, high scorer, etc.; and providing a synchronizing link to connect the GWEs in a tournament, with their respective ESEs. This is accomplished via the GWE management server 402 over this link by exchanging a host of information related to the field of ESEs, such as ESEs 412*a* to 412*d*, participating in the tournament. Such a function is necessary because in a tournament, any given GWE, such as GWEs 410*a* to 410*d*, included in a game may not be aware of the relationship of itself to the rest of the tournament field since in a typical configuration the actual tournament play is conducted on the ESE hosting server 406.

Link C 416 is for signaling between the GWE management server 402 and the GWE patron management server 404. Various information is communicated on this link, including but not limited to configuring tournaments according to system programming conducted by the operator; exchange of data necessary to link a player's profile to their ability to participate in various game play and the difficulty of play set by the GWE management server or a GWE in the game they are playing on; ability to participate in a tournament as a function of their character's characteristics, their gaming prowess, GWC and other metrics used for tournament screening; configuring the game including GWE and ESE performance to suit preferences of the player on that particular game as recorded in their player account; the GWE patron management system receiving data from the GWE management server regarding a player's play and gambling performance for the purposes of marketing intelligence; logging secondary drawing awards, tournament prizes, RC and GWC into the player's account.

The actual location of where various algorithms and functions are executed may be located either in the game included devices (such as RWEs 408*a* to 408*d*, GWEs 410*a* to 410*d*, and ESEs 412*a* to 412*d*), on the servers (such as the RWE server 440, the GWE patron management server 404, the GWE management server 402, or the ESE server 406), or a combination of both. For example, certain GWE functions may operate on the local GWE unit included with the game, supported where necessary by the GWE management server, and other functions may operate solely on the GWE management server itself. It should be noted that, where functions are described as operating on an individual GWE, for instance, simply listing the GWE is done by way of example and not by way of limitation as such a function may be located on the GWE management server if that makes for a more efficient method of accomplishing the function within the architecture. The same can be said of the RWE and RWE odds engine and win/loss server, or the ESE and the ESE hosting server.

In addition, any of the servers listed may be one or a plurality of servers, the term servers relates to the software and may be run on one or more physical devices and a multitude of servers may be combined on one device. It should also be understood that various functions described herein are not limited to residing on one server or the other, but rather may be shared across the architecture as would be prudent for streamlined system design. Furthermore, not all servers may be physically located in the same location, and may be distributed over a number of physical devices.

It should also be noted that communications and signaling on the links is intended to be bi-directional where necessary to exchange the information in question.

The connections illustrated in FIG. 4 may be physical in the case of separate physical servers and devices, or may be virtual in nature in the case of the exemplary elements operating as virtual machines on one or more servers.

The connections shown in FIG. 1 and FIG. 4 are by way of example and not of limitation and illustrate one implementation of a gaming system. Those skilled in the art of gaming will understand that there may be other methods for coupling the exemplary elements.

Figure 5:
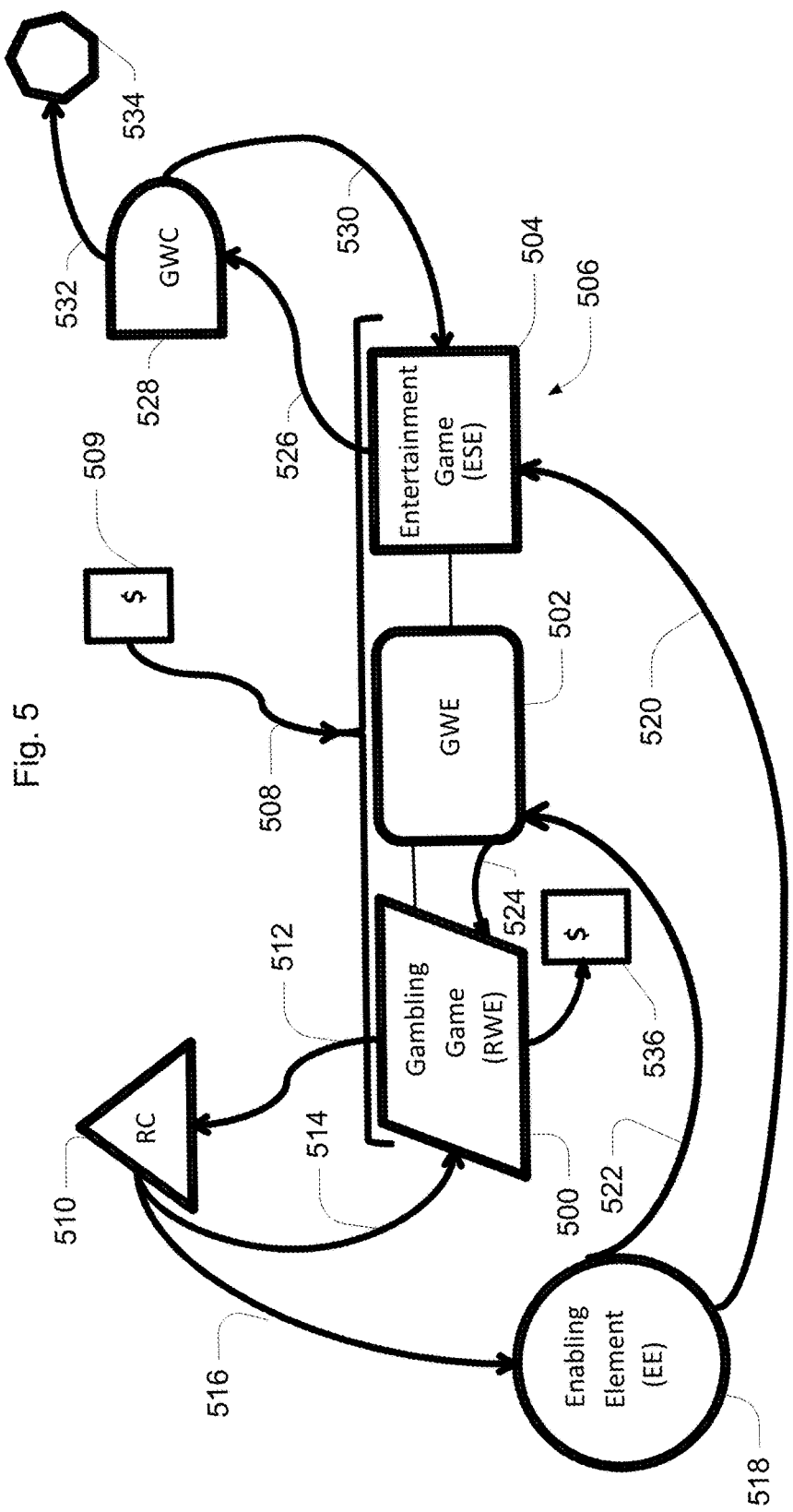
FIG. 5 is a collaboration diagram illustrating an exemplary operation of an RWE, a GWE and an ESE.

Having described an architecture for a gaming system, the operation of the gaming system will now be described. FIG. 5 is a collaboration diagram illustrating an exemplary operation of a gambling game 500 as controlled by an RWE (such as RWE 104 of FIG. 1), a GWE 502 and an entertainment game 504 as controlled by an ESE (such as ESE 106 of FIG. 1), that are connected together within a gaming system 506. Initially, a player (not shown) inputs (508) cash or an equivalent credit 509 into the gaming system. The input of the credit creates RC 510 managed by the RWE. The RC is used to enable (512) the gambling game of the RWE and the RC is consumed (514) by the gambling game of the RWE. RC correlates (516) to the creation of EE 518 (such as bullets, fuel, health points, potions, etc.) to be used when playing the entertainment game of the ESE. The EE is consumed (520) when the player operates the entertainment game of the ESE. The consumption of the EE informs (522) the GWE, which triggers (524) the RWE to execute the gambling game of the RWE which consumes the RC.

In another aspect, EE can be augmented (540) by the GWE in response (542) to actions in the entertainment game of the ESE, such as a player picking up more bullets, potions, fuel, etc. which can be added back into the EE (518). In addition, the GWE may scale (543) how much EE is augmented to the EE (518) independently of the ESE. In a similar manner, the ESE may augment (link not shown) the RC 510 via the GWE (560) with the GWE applying a scale (562) to the added RC independently of the ESE.

GWC may be affected by the player playing the entertainment game of the ESE 504, success or failure causes the ESE to either add to or drain (526) the GWC 528. The entertainment game of the ESE may also be driven or modified (530b) by the GWE 502 based (530a) on the GWC. The GWC may also be routed or consumed (532) to enter and play a tournament 534.

At the end of play when the player cashes out of the gambling game of the RWE 500, the RWE issues cash or other credit 536 of the amount of any remaining or won RC 510 that was not consumed by the gambling game of the RWE 500.

Figure 6:
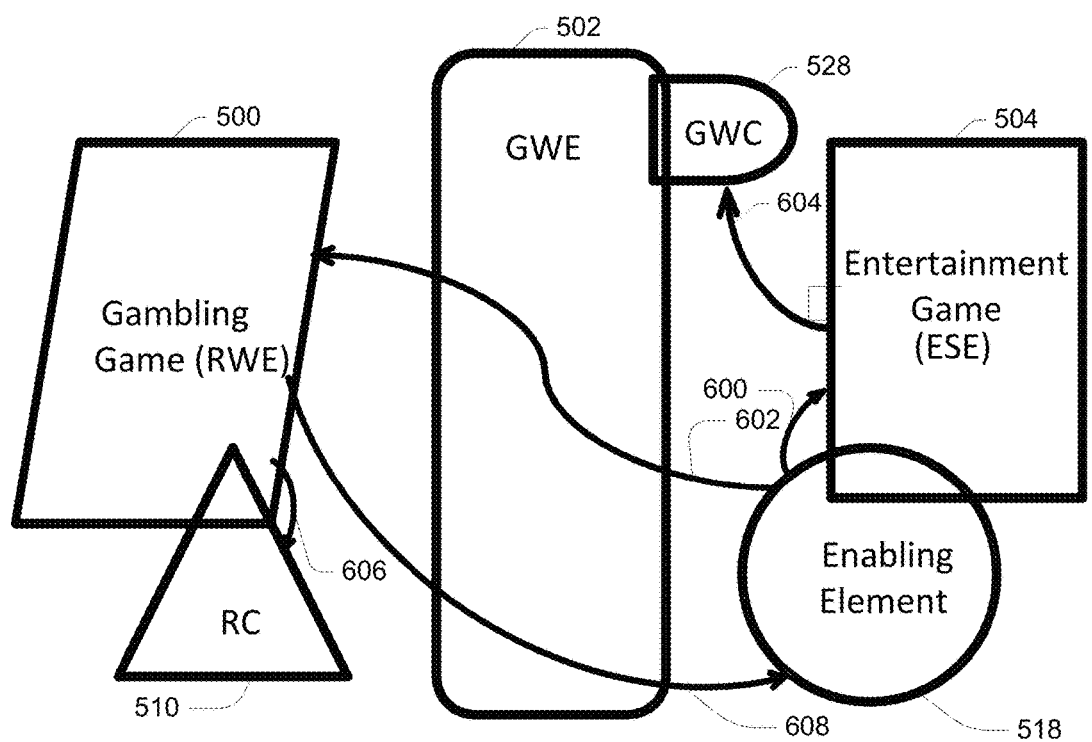
FIG. 6 is a collaboration diagram illustrating an exemplary operation of an RWE, a GWE and an ESE wherein the consumption of an Enabling Element (EE) triggers a gambling game in the RWE.

In slightly more detail, FIG. 6 is a collaboration diagram illustrating an exemplary operation of the gambling game of the RWE 500, the GWE 502 and the entertainment game of the ESE 504 wherein the consumption of EE 518 triggers the gambling game of the RWE. While playing the entertainment game of the ESE, a player (not shown) executes actions in entertainment game of the ESE via consumption (600) of the EE by the ESE. Consumption of the EE by the ESE causes the gambling game of the RWE to be triggered (602) via the GWE, thus consuming RC 510. Accordingly, events in the entertainment game of the ESE are triggered, thus consuming EE, in direct correlation and simultaneously with consumption of the correlated RC. In addition, during play of the entertainment game, GWC 528 is augmented or reduced (604) as appropriate by the success or failure of the player while playing the entertainment game.

The outcome of the gambling game of the RWE 500 augments (606) the RC 510 if the player wins the gambling game of the RWE. In addition, the EE 518 is augmented (608) simultaneously if the RC is augmented.

Figure 7:
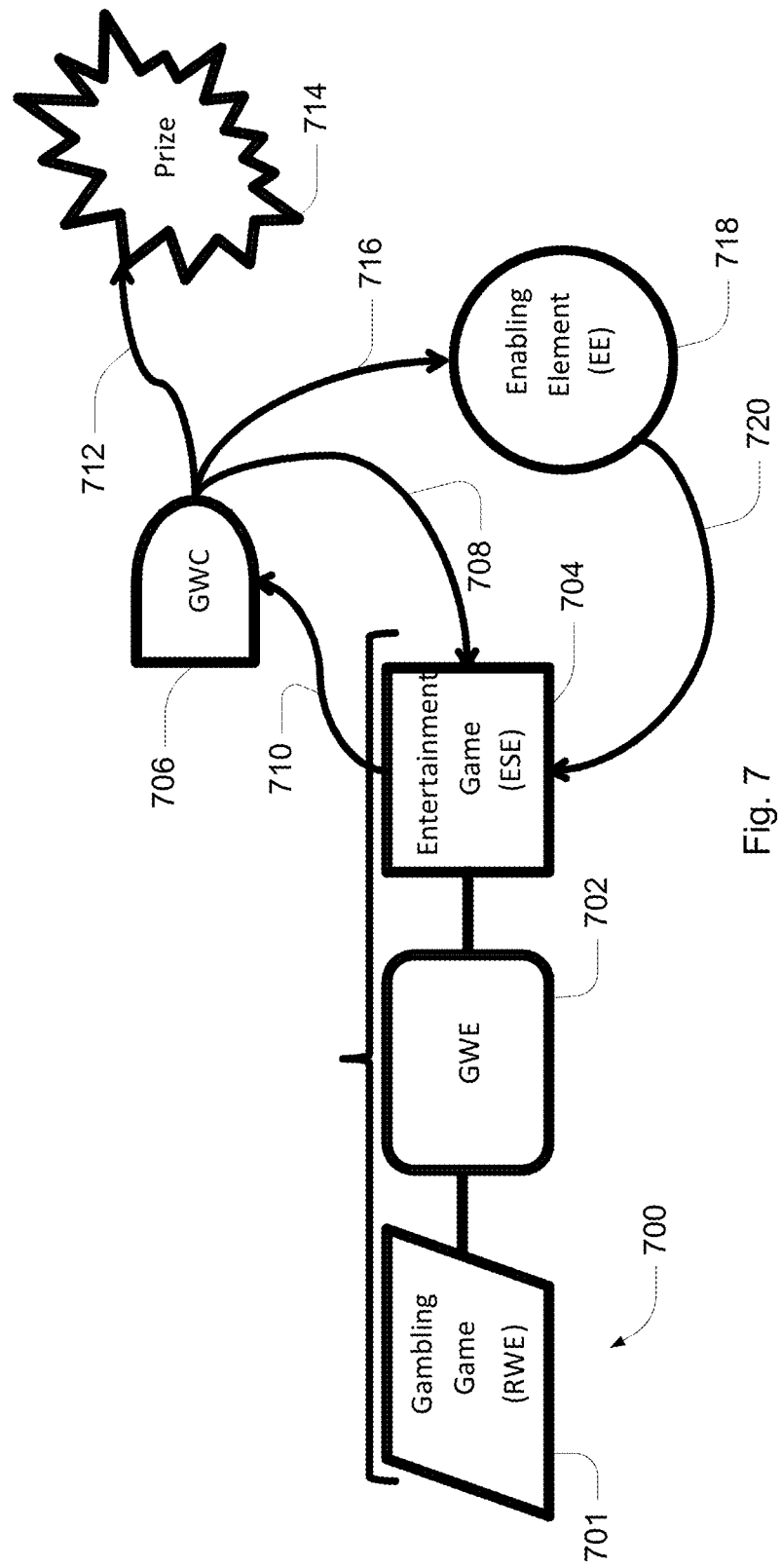
FIG. 7 is a collaboration diagram illustrating an exemplary operation of tournament play.

Having described the operation of a gaming system, the operation of the gaming system during tournament play will now be described with reference to FIG. 7. FIG. 7 is a collaboration diagram illustrating an exemplary operation of tournament play of a gaming system 700. The gaming system includes a gambling game of an RWE 701, a GWE 702 and an entertainment game of an ESE 704. GWC 706 is used to enter a tournament and enable the ESE. Play of the ESE can consume (708) and/or can add (710) to the GWC via the GWE based on formulae or algorithms within the GWE which can be affected in turn by parameters set by the casino operator. The GWE reduces (708) GWC to enable the consumption (709) of the GWC by the ESE via the GWE. The GWE can also add (710) to the GWC in response the ESE's consumption (711) of the GWC via the GWE. Entry to the tournament can also cause GWC to be consumed prior to commencing play of the ESE, in the manner of an entry fee.

The entry fee can be set by the casino operator on a tournament-specific level, or can be varied by specific player, etc. in the context of a specific tournament. The amount of the GWC remaining at the end of the tournament or some other exit point can be used to redeem (712) a prize 714 that may include cash.

In one aspect, the GWE can consume (710) the GWC 706 in order to augment (716) the EE 718, thus correlating the GWC and the EE. The EE is then consumed (720) by the GWE in enable the consumption (709) of EE by the ESE 704 in order to operate the entertainment game of the ESE.

In one aspect, a player either has an account on the game system or game network or they do not, as in the case of a new player. If a player is new to the network, or a player wishes to change their preferred profile, a setup process, similar to a wizard, is run.

The setup process can encompass a number of GW parameters, some of which may affect the RW gambling proposition. In the case of such factors which would impact the RW gambling proposition, the implications of choices the player would make and their effects on the gambling proposition would be clearly disclosed to the player. These factors may be that the selection of a type of character means that 2 RC instead of the standard 1 RC will be bet on each gambling play of and RWE, for instance. Or, each time a particular special type of weapon is fired by the character, a maximum RC bet will be placed. It's important to note that whilst improvement of one's profile in the GW space may increase the amounts in play by the automated RWE, one's ability to increase the amount of GWC gained in the GW scenario being played also is enhanced. This can provide an enjoyable dynamic for "garners" of all levels and financial means. Also important to note is that the ability to change one's profile may not only be run as a setup function, but also may occur real time within the game. For instance, a player's character in a game comes across some special armor. A choice, via the user interface, is given to the player: For example, take the armor, increase a player's protection rating by +3, and during the time that the player is wearing the armor, RC will be wagered at a rate of 3 RC per RWE game play. In this manner, a player's choices within the GW space can enhance or retard their RW gambling play, but in all cases, the choice and the cost are clearly disclosed to the player who makes the choice. During these selection periods, the RWE's operation would be suspended for a reasonable amount of time so player's had sufficient time to make a choice proper for them based on the funds they have to responsibly play with, considered against how much they wish to advance their character's performance in the GW game.

GW factors can impact the speed of the RWE's gambling plays and proposition, the size of RC wager, entering of bonus rounds, selection of Table Ln-RC levels, and the use of RC in the RWE engine. Some GWE parameters that might affect RWE play, include character type (e.g. a sword warrior, a wizard, a cleric, a special forces soldier, etc.) weapon type (e.g. a handgun, a rifle, an automatic weapon, a flamethrower, bazooka, etc.); armor type (e.g. Kevlar, chainmail, hardened steel, composites, etc.); dexterity rating of the character; strength rating of the character; intelligence of the character; speed of the character; type of car used in a driving game; the type of sword in use and benefiting from the effect of a special potion.

The foregoing examples above are not intended to be exhaustive or all inclusive, but rather serve as practical examples for how the GW profile may affect the RW gambling proposition through various inputs to the RWE, consistent with player choices which are allowable in the normal context of regulated slot machines today (e.g., amount of credits per spin, etc).

In another aspect, GWC would be used to purchase various equipment or to enhance the player's character in the GW environment. As mentioned above, in addition to the GWC cost of the selection of various equipment or enhancements, RWE inputs may also be affected, such as the amount of RC wagered per RWE game, the amount of RWE games per minute, and so on.

In another aspect, a GWE includes the constructs to enable a player to import GWE parameters, complete or partial player characteristics and/or profiles, and/or specific characteristics of the video game environment that were previously exported from a console resident instance of the video game in question. Alternately, the importation of these "elements" can also take place from an instance of the game operating on the Internet, a PC, or any other instance of the game.

In this way, a certain game level, a mini-game, a specific weapon, a player character (and the pertinent attributes), a special feature, etc. can be brought from a console—(or other) resident instance of the video game into the casino environment. Importation can take place one of a number of ways. The importation can take place through direct data download from a USB memory stick or other storage device (e.g. a CD) or by pulling the imported element(s) from the Internet using a web-enabled interface within the GWE that includes appropriate security features and that ultimately interfaces directly with the console or a web service to which the elements to be imported were previously (or simultaneously via hand-shaking between the importing and exporting software) exported via the console (or equivalent).

Conversely, game elements (including complete game state so that the game can be continued on another device) can be exported by the GWE to a web service from which other game devices (consoles, mobile devices, PCs, other casino machines in different locales) can subsequently (or simultaneously) import the element(s).

In both the case of import and export, appropriate security means can be used to ensure access to the imported or exported information is restricted to the owner (i.e. the player) of that information.

In another aspect, game elements are imported and exported on a peer-to-peer basis, such that there is no global identifier or global profile associated with the imported/exported elements, and also the case where a unifying profile ID or other identifier is used to ensure that a given player state or game state is synchronized across any and all instances of the game that a person might play (i.e. a unique identifier is used to ensure portability of the complete game state—or a subset of the game state such as a character profile for example—across all instances of game machines/software where the game may be played).

These import and export functions allow gamers to shift their gaming experience seamlessly between casino-based gaming/gambling machines and home- or mobile-based gaming platforms that do not include a gambling element. This reinforces the franchise of the underlying game and encourages additional game play and is particularly useful in games where the game action takes place across multiple levels and/or extended periods of time, and where player attributes evolve as the game progresses.

In another aspect, synchronous coordination of casino-based games and home- or mobile-based game software (where gambling may or may not be taking place) is provided so as to enable head-to-head game play, tournaments, and multi-player or massively multi-player games that encompass both players that are and are not gambling, only players that are gambling, or only players that are not gambling.

In another aspect, the GW game dynamically adjusts its difficulty in response to the player's skill as perceived by the system. While this has no effect on the ultimate outcome of the RW gambling from a RC perspective, it gives the player a custom experience tailored to his or her abilities. This dynamic adjustment of difficulty can be used to effect the payout of GWC as embodied in Table Ln-GWC and by virtue of presenting more valuable (from a GWC perspective) challenges to the player to be overcome.

In another aspect, a GWE includes constructs to operate GW gambling games within the GW construct where a player's character can interact with a GW casino environment. In this GW casino, a player may take time away from the game to gamble some of their GWC or RC, via their character, against the house or against other players in a head to head manner in order to win GWC, RC or perhaps some fixed increment of game play time. For this feature, the GWE requests a win/loss result from the RWE in order to provide a fair gambling proposition, and reflect the result to the any participating players. In this mode, a player's character's attributes may be used to enhance or modify the GW gambling proposition. For instance, perhaps a wizard would have better luck in the GW casino than a troll due to his finesse and intelligence. Beyond bringing character attributes to the table to improve one's chances, the GW casino would be entirely random odds based and thus based on luck. Architecturally, the player interface for the GW casino may take the form of a seamless visual construct within the ESE's game world, or may be a type of pop-up whereby the player's character is transported temporarily to the GW casino which operates outside of the ESE unit and in a different visual environment, in which case during such time that the ESE is paused so that the player may "relax" in the GW casino and take a "vacation" from the stress of everyday life in the ESE's competitive environment.

In another aspect, a GWE allows an operator to set a number of thresholds within the GW and RW environments in order to trigger automatic awards, elevate players to enhanced standing or retard their status, make them eligible for tournaments, prizes, secondary drawings (described later) and other such experience enhancements. To accomplish this feature within the architecture, the operator programs a GWE management server and/or a GWE patron management server with the desired thresholds, and these servers in turn configure an entertainment game of a GWE and uses the GWE's services to monitor GW game play so as to identify matches to the specified thresholds. Signaling between devices and servers ensures that the appropriate awards, eligibility and other actions are properly recorded for a given player and their characters, and that the players are suitably informed as to these changes in status, awards, eligibility, etc.

In another aspect, a GWE is configured to allow a player to play for game time as a function of their performance in the GW. An example would be a GW offering to a player's character allowing them to compete in a contest, perhaps a feat of agility, where they would run an obstacle course against a magic lizard. This contest, unlike the previously cited gambling game, would be based mostly, if not purely on skill. Architecturally, to accomplish this, the GWE signals an ESE to make available the contest and either the GWE or the ESE signals the player to elect to join or decline the contest via the user interface. If some measure of luck is involved, the GWE pulls gambling proposition results from an RWE and melds this via an algorithm into the contest in a seamless manner from the player's perspective. After the player has taken a break to run the contest, play could resume on the ESE once signaled to do so by the GWE. The availability of, and scale of such GW contests would be under control of an operator as a function of their programming of a GWE management server.

Having described an architecture and methods for implementing a gaming system having a gambling game and an entertainment game, various types of game played on such a gaming system will now be described in more detail. In one exemplary game, each level of an entertainment game is a race of specific length (i.e. distance). Use of RC purchases fuel as an EE to participate in the race and is used to enable the game. A player controls include a steering wheel, accelerator, brake, and special feature buttons such as a "power boost" for increased speed. A player may decide on a car of a specific grade, say a NASCAR style car, or the highest performance vehicle, a Formula One race car. One impact of the choice of the grade of the car would be to determine the amount of RC placed on each RWE wager. The RW use of RC as a function of the car selected would be disclosed to the player at the time of setup, so that the player was in complete control of the rate of use of their RC. The better the car grade, the faster a player can drive, the greater the challenge, the better their track time against the game or against other networked racers, resulting in the greater amount of GWC that can be earned, or lost in the case of a wreck.

In this example, a player has selected their car, and the race begins. The player pushes the accelerator, resulting in the use of fuel. An algorithm in a GWE triggers RWE plays for the amount of RC per play attributed to the vehicle selected, as a function of the rate of fuel burn per minute. As RC is consumed by the RWE, the amount of fuel available for the race (the EE) would be reflected in the GW game. If RC was won as a function of hitting a jackpot, fuel count, as EE, would be increased, thus allowing the player to continue competing in the race. Simultaneous with the real time fuel gauge would be a RC credit meter display, so actual RW game play could be tracked and clearly understood.

As the race progresses, performance on lap times against the expected pace for the given vehicle would cause the accrual or expense of GWC. If a particularly good lap was accomplished, GWC could be awarded as a jackpot in a non-linear fashion as determined by Table-Ln GWC. Wrecking the car would cost GWC as a penalty, and winning the race would achieve a large win of GWC as posted for the race.

The time for the player to complete the race course would be measured. The time is used as the input to Table Ln-GWC, and a specific time must be beat by the player to gain enough GWC to access L(n+1). Therefore, it is possible for a player to lose the game from an RC perspective but to gain enough GWC to proceed to the next level (assuming the player puts more RC into the game to buy fuel to continue a race or enter a new race).

Once the player plays enough levels (and accumulates enough GWC) to hit Level B1, the game can continue as a combination of chance and skill, or it can shift to a skill-only game. In this embodiment, fuel would no longer be monitored in the game, and a player would be able to race so long as the game allowed them to do so without having any consideration for fuel.

In another aspect, players with adequate GWC to gain access to Level B1 are invited to a championship race at a specified time and place. Such a championship may or may not require an entry fee, and may or may not pay out cash or other prizes to the winner (s).

Note that this example is not intended to be all inclusive, but rather cites only one manner in which the various components of a gaming system may be combined to accomplish an entertainment and gambling game.

In another exemplary game, each level of the game is a dangerous beast shooting game where the player purchases participation in the game with cash or credits, and these in turn purchase bullets, as EE, which are used by the player in the game. The player interfaces with the game through a mock rifle and scope, aiming at animals that move through a simulated environment on the screen, and using purchased bullets (via expenditure of RC) to shoot at the fearsome beasts. It is clearly disclosed to the player at the outset that each pull of the gun trigger resulting in one bullet being fired will trigger a play on an RWE for one RC. A hit on the beast will gain the player so many GWC, based on the beast and the situation. A player may also elect to use an automatic weapon, in which case multiple RC will be gambled for each pull of the trigger. Since the chance of a hit is greater the more bullets are used, a player may be incentivized to select an automatic weapon in their drive to accumulate greater GWC over time.

Within the workings of the entertainment game of an ESE, for each pull of the trigger, the RWE is triggered to conduct a gambling game, each wager being the number of RC which equates to the burst of bullets for the pull of the trigger. The RWE utilizes its Table Ln-RC to determine the outcome of the gambling game so far as RC won or lost. Simultaneously, the ESE determines a hit or miss on the beast and the GWE, by its coupling to the ESE determines the amount of GWC won. Within the GW context, beasts may often go on the offensive, requiring the player to shoot or die. There would be no RC impact of player injury or death, but there would be a direct GWC impact. If a player felt they had gambled enough, they would simply not shoot and die, or cash-out. Neither action would have an impact on their RC earned/lost in the RW gambling proposition.

As the game progresses, the difficulty and quantity of beasts would increase, and the GWE would utilize its Table-Ln GWC to adjust GWC earned accordingly. Meantime, the RWE would continue its gambling operation triggered by pressing of the trigger, and the amount of RC wagered based on the weapon as a function of its rate of fire. If RC was won as a function of gambling on the RWE, bullets, as EE, would be added to the players available bullet count. In this manner, skill of the player could be continually challenged with direct GWC rewards, but the RW gambling proposition would stay purely random and not skill based.

The number and/or type of animals "killed" by the player, as well as the nature of the shot (i.e. where the animal was struck) can also be measured. All, or some of this data can be used as input to Table Ln-GWC, and a specific number of kills and/or quality of hits made must be achieved by the player to gain enough GWC to access re-entrant level $L(n+1)$. Therefore, it is possible for a player to lose the game from an RC perspective but to gain enough GWC to proceed to the next level (assuming the player puts more RC into the game). Alternately, because at this stage the player is participating in a re-entrant level of the game, the player can enter more RC and play again at the same level, even if inadequate GWC was acquired to move on to a higher level of the game and even if they lost the game from a RC perspective.

Once the player plays enough levels (and accumulates enough GWC) to hit Level B1, the game can continue in this fashion as a combination of chance and skill, or it can shift into a skill-only game pitting the player simultaneously against a fixed number of other players who also gained entry to the championship in a tournament environment. In one aspect, players with adequate GWC to gain access to Level B1 are invited to a championship hunt at a specified time and place. Such a championship may or may not require an entry fee, and may or may not pay out cash or other prizes to the winner(s).

Note that this example is not intended to be all inclusive, but rather cites only another manner in which the various components of the gaming system may be combined to accomplish an entertainment and gambling game.

In another exemplary game, each level of an entertainment game of an ESE is a round in a boxing match. RC purchases participation in the game by loading up stamina points as correlated EE. The player interfaces with the game through two hand-held controllers in Wii®-like fashion, enabling the player to "punch" and "parry". When a player successfully lands a punch, GWC is earned. When a player is hit, GWC is lost. A player may select an especially tough fighter if desired, who's crushing punches will earn greater GWC, but will consume more stamina as EE, and hence correlated RC.

In the game, a player triggers each run of a gambling game of an RWE with each punch. Table Ln-RC determines the outcome of the gambling proposition and stamina available for punching is decreased of increased accordingly. The fight continues, and the player, based on their skill can earn GWC, or lose it, based on how well they beat their opponent, or how badly they're beaten. Meantime, the RWE continues its operation triggered by the player executing a punch (or series of punches) on the opponent. If the player knocks out the opponent, a GWC bonus is achieved.

The number of punches landed and defended by the player is also measured. This number is used as the input to Table Ln-GWC, whereby a player accumulates GWC. In this example, a player advances to $L(n+1)$ from $L(n)$ as a function of the game's Table Ln-RC. Table Ln-RC and Table $L(n+1)$-RC need not have identical payout schedules.

Once the player accumulates enough GWC to gain entry to Level B1, the boxing game might continue as a skill-only game pitting the player against a fixed number of other players who also gained entry into a boxing tournament of, for example, 16 players. The tournament might necessitate payment of an entry fee, and may or may not pay out cash or other prizes to the winner(s).

Note that this example is not intended to be all inclusive, but rather cites another manner in which the various components of the gaming system may be combined to accomplish an entertainment and gambling game.

In another exemplary game, each level of an entertainment game of an ESE is similar to a round in the game Time Crisis®. A player purchases RC for the game, and these are symbolized as bullets, as correlated EE, used to enable play in the GW entertainment game. The player interfaces with the entertainment game through a hand-held pistol, foot pedal (for re-loading), and a large screen. Health is also a factor in the game, but only in the GW sense. During the game, a player may select one of a number of different weapon types (e.g. pistol, shotgun, machine gun, grenade launcher). The type of weapon deployed determines the amount of correlated RC that is wagered with each pull of the trigger. For example, pulling the trigger when using the pistol could result in a single unit of RC being wagered, a shotgun three units of RC, a machine gun five units of RC and a grenade launcher might result in ten units of RC being wagered.

Within the workings of the game, for each pull of the trigger, an RWE is triggered to conduct a gambling game, each wager being the number of RC which correlates to the type of weapon being used in the game. The RWE utilizes its Table Ln-RC to determine the outcome of the gambling game so far as RC won or lost. Simultaneously, the ESE determines a hit or miss on the enemy characters and the GWE, by its coupling to the ESE, determines the amount of GWC accumulated by the player. There would be no RC impact of player death, but there would be a direct GWC impact. If a player felt they had gambled enough, they would simply not shoot, and die, or cash-out. Neither action would have an impact on their RC earned/lost in the RW gambling proposition.

The player uses the controls to shoot enemy figures as his character traverses the terrain. GWC is accumulated as a function of the number of "kills" and "accuracy". So long as the player has bullets, as EE, to expend, the player will be able to use their skill to accumulate GWC. If the player is of higher skill (as measured by the game based upon player performance across the prescribed opportunities, additional opportunities may be presented to allow GWC to be accumulated at an accelerated rate.

Player performance in terms of "kills" and "accuracy" is used as the input to GWE operating system and its requisite Table Ln-GWC, and a specific number of points must be achieved by the player to gain enough GWC to access to $L(n+1)$. Therefore, it is possible for a player to lose the game from an RC perspective but to gain enough GWC to proceed to the next level (assuming the player puts more RC into the game).

Once the player makes it through enough rounds (and accumulates enough GWC) to hit Level B1, the game might continue as a skill game with an element of chance (in the form of the difficulty experienced by the player) pitting the player (or a player and a partner in a multi-player arrangement) against a fixed number of other players who also gained entry into a tournament.

Note that this example is not intended to be all inclusive, but rather cites only another manner in which the various components of the gaming system may be combined to accomplish an entertainment and gambling game.

In another exemplary game, the player is engaged in a computer game of Scrabble® against the machine and/or one or more other players. The player purchases participation in the game with cash or credits. During each turn of the Scrabble® game, the player places letters on the virtual game board to formulate words. As in the conventional Scrabble® board game, each letter has a number of points associated with it. For example, the letter "Z" is worth 10 points, and "A" is worth one point. Placing letters on the board to form words (presuming they are not subsequently challenged by the computer and/or other players and therefore removed) causes GWC to be accumulated by the player.

The placement of letters on the board also triggers the RWE to conduct a gambling game, each wager being the number of RC which correlates to the sum of the points, as EE, laid down on the board by the player during his turn in the Scrabble® game. For example, if a player places the tiles "A" and "T" on the board, they would wager two units of RC as the letters "A" and "T" each carry one point in Scrabble®. A player placing the letters, "ZOO" during their turn would wager twelve RC (Z-10, O' 1). In another embodiment, the amount of RC wagered could also be a function of the player's word score (including bonus features such as "double word score" or "double letter score") during his turn. A player can always refrain from wagering RC by declining to place letters on the board during his turn, or turning in his letters for new ones. Absent adequate RC, the player would be unable to place letters, as EE, on the board as part of the GW Scrabble® game.

The Scrabble® game may also include special promotional rewards controlled directly by the casino, such that when a player places letters on the virtual game board, certain squares on that board trigger the payment of RC or other promotional items (e.g. free meals, free drinks, show tickets, etc.) on a bonus basis, and not as a function of a RC wager within a gambling game. How many of these promotional rewards exist per Scrabble® game played can be a function of the players' status within the casino, their performance within the GWE rendition of Scrabble® and/or other factors to support the casino's strategy to retain and reward customers. These reward generating squares may or may not be known to the player before he places a letter down on the square (i.e. the rewards may be displayed on the graphical rendition of the board or they may be hidden until a tile is placed on the square).

Player performance in terms of Scrabble® points accumulated pursuant to the conventional Scrabble® game rules is used as the input to the GWE operating system and its requisite Table Ln-GWC. A specific number of points must be achieved by the player to gain enough GWC to gain access to L(n+1). Therefore, it is possible for a player to lose the game from an RC perspective but to gain enough GWC to proceed to the next level (assuming the player puts more RC into the game). Subsequent levels would feature more challenging computer and/or human opponents.

Once the player makes it through enough rounds (and accumulates enough GWC) to hit Level B1, the game might continue as a tournament with specialized prizes, pitting the player against a fixed number of other players who also gained entry into the tournament.

Note that this example is not intended to be all inclusive, but rather cites another manner in which the various components of the gaming system may be combined to accomplish an entertainment and gambling game.

In another exemplary game, each level of an entertainment game of an ESE is a strategic game whereby the player deploys tanks as EE into a battlefield to achieve a predefined mission while engaging in combat with computer controlled tanks and/or tanks controlled by another player. A player purchases RC for the game, and these are represented as tanks to be used within the GW game. The tanks, correlating to RC on a one-to-one basis, are parked within a corral. The player decides, during each round of the GW game, how many tanks to release from the corral and into the field of battle. Each tank can be configured in the GW game by the player to reflect various trade-offs between speed, gauge of weapon, amount of armor, and maneuverability. Each tank can also be given a directive (e.g. position yourself in the stand of trees to the left), a mode of operation (e.g. aggressive, defensive), and deployed within a specific formation. Each of these decisions is made in the context of the terrain, the perceived characteristics of the enemy force and the goal of the mission.

The number of tanks that the player releases from the corral into the battle (and which then act autonomously based on the configuration, directive, mode of operation and formation assigned to them) determines the amount of RC that is wagered. For example, sending three tanks out of the corral and onto the battlefield causes three RC to be wagered. In this variation of the gaming system, the gambling wager is made at the onset of each GW game as the exit of tanks from the corral triggers the RWE to initiate a gambling game. Thereafter, the GW game is played to its conclusion absent the wagering of additional RC unless the player decides to move additional tanks into the field of battle (which is not required).

Player performance in terms of enemy tanks destroyed relative to own tanks destroyed is used as the input to the GWE operating system and its requisite Table Ln-GWC. A specific number of points must be achieved by the player to gain enough GWC to access L(n+1). Therefore, it is possible for a player to lose the game from an RC perspective but to gain enough GWC to proceed to the next level (assuming the player puts more RC into the game).

Once the player makes it through enough rounds (and accumulates enough GWC) to hit Level B1, the game might continue as a skill game with an element of chance (in the form of the difficulty experienced by the player) pitting the player (or a player and a partner in a multi-player arrangement) against a fixed number of other players who also gained entry into a tournament.

The tank game may also include special promotional rewards controlled directly by the casino, such that when a player's tanks destroys a particular enemy tank the awarding of RC or other promotional items (e.g. free meals, free drinks, show tickets, etc.) on a bonus basis, and not as a function of a RC wager within a gambling game, takes place. How many of these promotional rewards exist, and their value, per tank game played can be a function of the players' status within the casino, their performance within the GWE tank game and/or other factors to support the casino's strategy to retain and reward customers.

Note that this example is not intended to be all inclusive, but rather cites only one manner in which the various components of the gaming system may be combined to accomplish an entertainment and gambling game.

In another aspect, the system includes the constructs to allow players that earn a prescribed amount of GWC while playing these games to participate in tournament play. Tournament play can be player vs. machine in a single-player mode or multi-player mode, and can also be player v. machine and/or other player(s). Tournaments can involve simultaneous play by two or more players or asynchronous play by one or many players. Tournaments can be formally scheduled events or ad hoc events triggered by attainment of a specific amount of GWC. Tournament play takes place in levels B1 through Bn.

A tournament may or may not necessitate payment of an entry fee, payment of GWC, and may or may not pay out cash or other prizes to the winner(s). A wide range of variations to the tournament format can be added, including the use of a loser's bracket that might necessitate the payment of an additional entry fee to continue. Tournament caps or minimums relating to character prowess can also be established to ensure relatively balanced competition.

Tournament play can involve players competing head-to-head simultaneously across a number of networked game machines or it can involve players competing on independent machines either serially or simultaneously and their scores being compared manually or automatically at the close of the tournament. Players can be exposed to their competitor's profiles during the tournament process, such that the "identity" of their competitors is known in the form of a user name, avatar or other defining characteristic(s).

Tournament play can take place across a network of a plurality of game machines, with a centralized server connected to the individual games, tracking GW performance across the game machines, each game machine being capable of operating intelligently in the context of a broad GW competition monitored by a central server. Alternately, a tournament can take place in the context of a plurality of game machines operating in more of a terminal mode under central control by a centralized server. The games, which are described herein, would support these two modes, and could be switched between them. Third, tournament play can take place across one or a plurality of game machines that are not networked together, using various media to store individual player's results which are then submitted for manual compilation and establishment of the tournament winner(s).

Tournaments can also include a set-up stage or "initial round" where GWC is used by a player or players to buy various equipment and special features to enhance the game experience. Examples might include a special sword, body armor, potions, higher horsepower engines, greater physical endurance or strength, etc. In some embodiments GWC can be spent to handicap other players. It can also be used live during the tournament. For example one could throw a spell or brew a potion. GWC can also be expended to affect another player's character and/or game performance. In some game embodiments it can be given to other players to use (e.g. to bolster the strength of a cooperating player) or traded or pooled with other players' GWC to benefit one or more players individually or as a team.

In addition to tournaments set up on a scheduled or ad-hoc basis by the casino, one embodiment would be configured to permit tournaments to be organized directly by players. Players can use the below mentioned 'centralized system for managing player accounts' to set up tournaments. They can define the size of the tournament, time and place, rules, entry cost (in terms of GWC), and prizes (again in terms of GWC) using guidelines controlled by the casino through the system, or in a more ad hoc fashion.

Consistent with various descriptions herein, a gaming system may be embodied in whole or in part in the "cloud" being based in the Internet thus taking place outside of a casino. In this mode, players access games through an Internet website and have an otherwise similar experience as related to RC and GWC. Tournament play would also supported in such a model. In summary, as it would apply to the descriptions herein, the only notable difference between a land based casino and an Internet based one would be whether players are present in a gambling operation location in the case of a land based operation, or at home or other distributed location in the case of the Internet based operation. In either case, the elements of the gaming system and their functions would operate effectively the same.

In another aspect, the gaming system includes a centralized system for managing player accounts. This management system, which is part of the GWE, can be property-specific, property group specific, title specific (spanning one or multiple properties—including Internet-based casinos or game play sites) or game-manufacturer specific. It can be linked to a frequent player card or other casino-related identification scheme.

In another aspect of this feature, the system stores, for each player account, one or more profiles, each profile keeping track of the player's game identity (i.e. a user name), and attributes associated with the profile. For example, this might include amount of GWC, the current state-of-play for that account (e.g. game level reached), attributes of the in-game character associated with that account (e.g. armor, weapons, amount of ammunition, body damage, skill), user preferences, etc. Typically, real world credits are not broken down to the profile level, but may be stored as part of the overarching player account. Also, a profile will typically be game-title specific, such that a given player account will include one or more profiles per game title played.

In another aspect of this feature, the centralized system can also provide a means for each profile to have attributed to it a name, a graphical representation of the profile (i.e. an avatar selected by or generated by the player), or other information linking the profile to the player (e.g. a photo of the player) account, etc.

In another aspect of this feature, the centralized system also allows players to interact with one another, either at the account or profile level. Bulletin boards are supported for the posting of messages, and can span one or more casino properties, game titles and/or on-line environments.

In another aspect of this feature, the centralized system also supports a reservation system whereby players can reserve a machine at a casino for game-play at a specific date and time. This can be done graphically or via text, and can allow one or more machines to be reserved such that individuals or groups can reserve specific physical locations to play. These reservations may or may not be accompanied by a deposit that may or may not be refunded when the reservation is filled, or other fee structure such as a minimum spending commitment to book the machine(s). The reservation system can also be designed to support the concept of group play, such that individuals or groups can set up ad hoc tournaments involving head-to-head competition or score-based competitions depending upon the nature of the underlying ESE game in question. Reservations can be made in the context of a player account and/or a player profile and/or be linked to an individual through a player card or other ID mechanism used within the casino environment.

As part of the reservation system, the casino, or other managerial entity, can schedule specific games and invite players, as a function of player accounts and/or profiles, to participate. A scheduling function within the reservation system keeps track of all reservations, tournaments, etc. within its span of control and can lock out specific machines from general use by walk-up players, as a reserved use period approaches. Only the player with the appropriate reservation can sign in to the machine and use it during the period in question. A mechanism for "kicking out" a player from a machine is also foreseen, such that a player that stays at a machine beyond the reserved period can be excluded from ongoing play. The system can also be configured to prevent "kick out" and to instead shift a reservation from an occupied machine to a different, open, machine, and to inform the player of this change via one of the below mentioned communication methods when attached to the player account in question.

The reservation system can monitor reservation requests to ensure that players that are going to compete against one another in an asynchronous or head-to "head competition/tournament are not seated directly adjacent to one another to preclude collusion between players outside of the game environment.

In another aspect of this feature, the reservation system also allows players to invite specific players (via their profiles) or unnamed players (i.e. an open invitation or "challenge") to compete against one another at a specified date or time, or within a specified period of time if the game is played asynchronously. Such challenges can be accompanied by bets between the players in the form of GWC (and/or RC) wagers. The system can accept invitations to such a "challenge game", monitor performance of the players to the challenge, and collect and distribute GWC as necessary in accord with the result of the game. The system can support both ad hoc challenges, where the challenger establishes the nature of the challenge, and pre-defined challenges, where a specific goal or scoring attribute is selected by the challenger from a pre-defined menu.

In another aspect of this feature, the centralized player profile and account management system also includes a GWC marketplace, whereby players can expend GWC to acquire a range of in-game attributes, possessions or characteristics for use in the casino deployed ESE game and/or in versions of the game that are used at home. For example, a player might expend GWC to buy "special ice skates" for use by his player profile in the casino version of NHL-2K that allows his character in the game to skate 5% faster. These special skates may or may not be able to be used, by virtue of a special key code or a physical key, in NHL-2K games running on conventional-box or PS3® consoles in the home. GWC pricing for in-casino and at-large use of the skates may not be the same. In addition, a player can expend GWC to purchase a range of casino promoted prizes or benefits for use outside the game environment, including discounts at casino shops, meal discounts, free game play, etc.

The centralized player profile and account management system, in addition to the aforementioned bulletin board method described previously, may enable players (via a specific account or at the player level) to communicate with other players, via their player profiles and/or at the player level, and also allows the casino (or manager of the gaming environment) to communicate with players outside of the gaming environment itself. The system can push communications to players through email and/or SMS messages, html, mobile phone apps, and/or text messages, voice mail messages or other communications means that a player has attached to his account. This allows players to received notices about specific opportunities for game-play, new high scores, challenges made, declined or accepted, and the status of reservations, etc. The system can also receive input via html, mobile phone apps, etc. to allow players to manage their account, set up reservations, make, decline or accept challenges, etc.

The centralized player profile and account management system also supports a sign-in system with password protection to protect player accounts from unauthorized access.

In another aspect, the system supports a Casino Operator's ability to specify GW performance attributes and metrics to manage the difficulty of game play. This feature operates by a GWE monitoring an ESE and making adjustments to the parameters governing ESE game play to hold the GW to an Operator specified skill level. For example, the Casino Operator could dictate, via the GWE, that the ESE entertainment game operate at no less than a skill level of '3', or specifically that game controlled opponents in a $1^{st}$ person shooter game hit their targets 25% of the time, the specific mechanism by which GW skill level is controlled being a factor of the mechanism afforded by the ESE entertainment game. These adjustments to the difficulty of game play may or may not be a specific response by the GWE (in accord with rules set by the Casino Operator) to the prowess of the player playing the game (a factor known to the GWE by virtue of the player account and subsidiary player profiles within that account). The adjustment of the skill level can also be part of a casino-wide approach to establish a certain threshold of game play difficulty or it can be applied across a subset of the casino's machines. The GWE can be configured to inform the player of the state of and changes to the game difficulty at the onset of and/or during game play.

In another aspect, the gaming system and GWE are configured to track game machine high score players, (in terms of GWC) across one or more game machines. Utilizing this feature, the system may include the means to issue additional GWC to the current high scoring player, on a time-metered basis, so long as that player remains the top scorer across the game or games in question. Similarly, high scorers 2-through-N may also accumulate GWC in this way as a function of their position on the leader board.

In another aspect of this feature, a leader board can be posted to each machine through the GWE and GWE Server, and/or can be displayed as part of the signage associated with one or more game machines inside the casino. A player profile and/or avatar's persistence on the leader board, and therefore their accumulation of GWC on a time-metered basis, continues according to parameters set by the Casino Operator. For example, a player will remain on the leader board or over game signage until they would be removed if he or she does not play again within a fixed period of time (e.g. 2 days or 30 days), or if the player rejects more than one invitation from another player for head-to-head competition over a 24 hour period.

With this feature, the rate at which GWC is accumulated by players on the leader board, the period over which GWC can be so accumulated, and the number of game machines across which the leader board applies, are a few of the variables that can be established by the Casino Operator, or in the case of an on-line system, by the managing entity.

Casino operators can, for example, increase the rate of GWC accumulation for the leader board related to a bank of machines getting low levels of play to induce more players to use these machines. A bank of machines experiencing very heavy game play might feature a lower rate of GWC accumulation by the players on its leader board or a shorter period before the accumulation is terminated without additional game play.

In another aspect, the system and the GWE include the constructs to allow a Casino Operator to manage a secondary drawing. The secondary drawing is a random drawing that awards GWC and/or RC and/or other prizes to participating players. Based on selections made by the Casino Operator, players participate automatically and in a real time or non-real time fashion as a function of achieving some pre-specified goal of their play on the ESE: (a) a specific level of GWC on a specific player profile is achieved, (b) accumulating a specific amount of GWC across all the player profiles within their player account, (c) accomplishing some feat in the game (e.g. taking out the warlock), (d) gaining GWC at a rate greater than a specified threshold, etc. The foregoing list is not intended to be exhaustive, but rather lists examples of various thresholds and goals which a Casino Operator may assign. "Other prizes", referenced above, include but are not limited to, RC, GWC, cash, merchandise, ESE assets for use within the gambling environment including tournament play (such as specialized armor, the ability of your quarterback to throw more accurately, access to "Easter Eggs" within the game, etc.), specialized software, software keys or hardware keys that allow ESE assets to be used outside the gambling environment (or that provide access to Easter Eggs) and on the analogous game (or another game title) on a conventional game console (e.g. Xbox®, PS3®, etc.), etc. The secondary drawing may or may not require the player to purchase entry into the drawing by expending GWC; it can also be free. The drawings may take place for each player immediately upon crossing a GWC threshold or paying the GWC entry fee, or may operate by issuing the player a real or virtual "ticket" representing a single entry into the drawing, the drawing taking place at a specific date and time. The secondary drawing may be solely for that player in that they have a certain chance of being drawn and thus being awarded the prizes, or they may be entered into a pool of entrants with one or more entrants being drawn and awarded a prize.

The gaming system interacts with the player to ensure that the player is well appraised as to his status in the ESE game (the skill game), the RWE game (the gambling game), and receives GWE-related information (secondary drawings, tournaments, etc.). The GWE and RWE are each represented by user interfaces with which the player interacts. The ESE is also represented through the GW user interface. These conceptual display and input devices can be independent physical embodiments for each of the RWE and GWE, or can be resident within a single physical device (i.e. portions of a flat panel display) or can consist of a multitude of displays and input devices for each major subsystem's conceptual display (RWE, GWE and also ESE).

In one embodiment, the ESE game appears in a window (created through software) on a physical display, the window being framed by a window (again software generated) consisting of information about the gambling game. Both are manifested within the same physical display. The RWE display, which frames the GWE display window (in which the ESE game appears), would provide any and all information relevant to the RWE game, including, but not limited to, number of credits, magnitude of current bet, winnings this session, results of previous RWE game play, odds of winning, active bonuses or multipliers, etc. The boundaries between the GWE game display window and the framing RWE game display need not be static. For example, the RWE game display window could impinge upon the GWE game display window, in a dynamic mode form, to alert the player to a change in the status of their RWE gambling game such as a winning event, losing event, jackpot round entry or other notable occurrence. A non-exhaustive list of examples of this dynamic impingement could be a starburst flash, an expanding bubble, a rapid zoom in, or a shaking screen). The GWE game display window would typically not impinge upon the RWE game display if such impingement would serve to obscure the player's information related to the RWE game, the number of credits the player has in the machine, etc.

Note that the shape of the RWE game display need not be a full frame enclosing the GWE game display window. It can consist of any portion thereof (e.g. a single side-bar), and need not be rectilinear in shape.

In addition to displaying the ESE game, the GW user interface is accessed by the GWE to interact with the player as relates GWE related functions (e.g. communications with other players, announcements and notices regarding tournaments and/or promotional offers, secondary drawings, etc.). These aspects of the GW user interface need not always be present. They can be hidden or displayed as governed by rules resident within the GWE, the rules taking into account the requirements of the ESE and RWE games and their display so as to not interfere with game play.

In another embodiment, additional physical devices can be used to communicate with the user as relates RWE gaming, the GWE and/or ESE game play, i.e. the user interface can span multiple devices. In terms of communicating information to the player, these additional devices can take the form of conventional visual displays normally associated with computers and/or visual communication (e.g. flat panel displays) or they can be electromechanical devices. For example, RWE gaming information could be conveyed to the player in whole or in part through LED numerical displays, or an electromechanical construct (e.g. an electromechanical needle meter could be used to indicate RW credits, A column of red fluid could indicate a player's "life status" in the ESE game, a transparent tube of balls could be emptied on the bottom and filled on the top to visually communicate overall credit status, etc.).

In the case of each of the RWE and GWE user interfaces, a plurality of physical devices can be subsumed therein. The GWE user interface, for example, could include multiple displays, or a single display plus one or more electromechanical devices (e.g. a vibratory shaker, audio speakers, flashing lights, etc.). The same is true for the RWE user interface.

The same plurality of options exist as relates the input devices associated with the RWE and GWE user interfaces. Each of these major subsystems can have its own input devices and/or share input devices with the other.

Note also that in terms of both display hardware and input devices, those items defined as part of the GW user interface can be connected directly to the GWE and/or the ESE. It is not a mandatory aspect of this gaming system that GW user interface hardware related to the ESE game be ported through the GWE to the ESE. This approach is subsumed by the gaming system described herein, but not a mandatory component of it.

Figure 8:
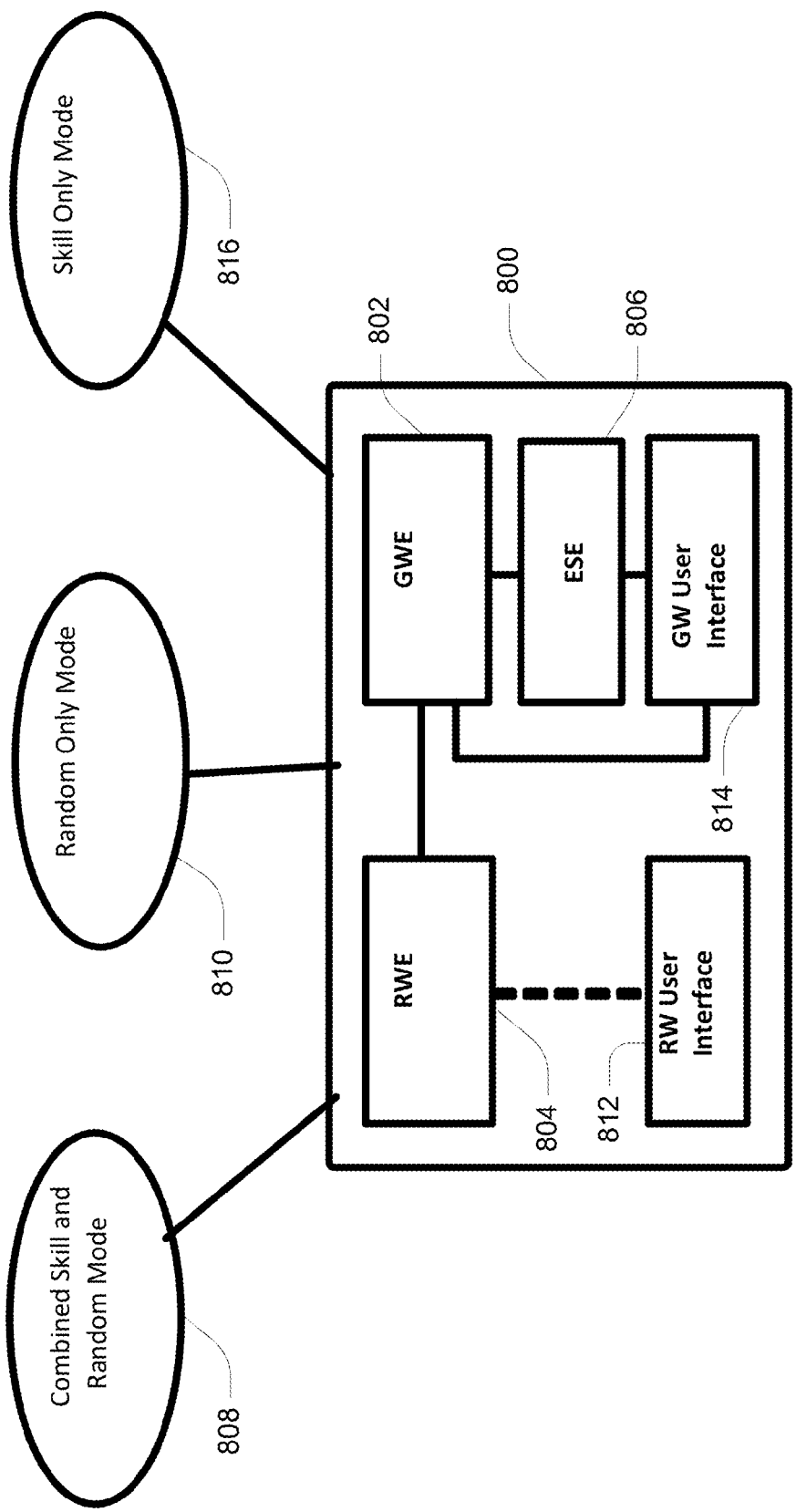
FIG. 8 is a state diagram illustrating exemplary modes of operation of a gaming system.

FIG. 8 is a state diagram illustrating exemplary modes of operation of a gaming system. In one aspect, the gaming system supports at least three modes of operation and the ability to switch between these modes is governed by the casino (or if the casino enables it, by a player). These three modes are called: combined Skill and Random Mode; Random Only Mode and Skill Only Mode and described in detail below.

Combined Skill and Random Mode

In its native mode, a gaming system 800 operates as previously described herein whereby a GWE 802, an RWE 804 and an ESE 806 act in concert to provide an enriched gaming environment combining skill and random game play (808). In this native mode, the RWE's role is to provide the fundamental operating system for a slot machine (random number generator, math tables, slot meters, account, currency handling, etc.) as previously described without any form of player entertainment functions which are left to the ESE.

Random Only Mode

A second mode of operation allows the entire gaming system to be switched to operate as a conventional slot-machine, wherein no skilled play is involved at all, and more conventional entertainment graphics such as spinning wheels of fruit or other objects within pay lines are displayed in response to a manual play trigger (e.g. spin reels button) to provide a traditional slot machine gaming experience in a random only game play mode (810). The conventional slot machine entertainment graphics in this second mode may be displayed on one or more of the game's user interfaces, such as an RW user interface 812 or a GW user interface 814 with the content of such being driven by one or more of the RWE 804, the GWE 802 or the ESE 806.

Skill Only Mode

The third mode of operation allows the gaming system to be configured for skill game play only 816. In this mode, the gaming system 800 operates much like a conventional video arcade game. The RWE 804 system is dormant so that there is no randomness except as is provided by an entertainment game of the ESE 806, and the GWE 802 and ESE operate in concert to provide a non-gambling gaming experience to the user. In this case, players may be charged money for game play in the mode of a conventional video arcade (e.g. money purchases a fixed amount of ammunition, lives or other metric). In this mode, the player cannot gamble on the outcome of game play, but a casino may still choose to operate tournaments and reward players with marketing prizes based on the amount of GWC they accumulate (as described above).

In a variant of the conventional slot-machine mode described above (see Random Only Mode), the ESE 806, via the GWE 802, is subordinated to the RWE 804 so as to display the results of the gambling proposition to the user through display output of the ESE to reflect the outcome of the RW gambling game. For example, in a system where the ESE game software is a football game (e.g. Madden Football®). The random outcomes of each RWE gambling game results in the player winning or losing credits. The amount of credits won or lost in the gambling game translates into yards gained or lost through a single football play. After the gambling outcome is determined by the RWE, this information is passed through the GWE to the ESE and a visual representation of the gambling outcome is displayed on a screen in the form of a football play being run from scrimmage. So from the player's point of view, the outcome of each RWE's gambling game is seen as a winning or losing play on the football field. Note that this ESE driven display does not replace the RWE controlled display of game credits and other information which continues through the RW user interface unabated. The data provided by the RW user interface is, in this embodiment, the display of record so far as a player, a casino and gaming regulator would go.

Such a scheme is capable of representing a wide array of gambling outcomes including bonus rounds, multi-credit or single credit bets, etc. For each RW game architecture, the possible outcomes are mapped to game software of the ESE 806. For example, continuing with the Madden Football® metaphor, a gambling outcome that results in 12 credits being won could be displayed via the ESE as a 12-yard pass play down the sideline, a run up the middle, a quarterback sneak, a recovered fumble, etc. Continuing on, a jackpot win could be a touchdown play, or recovered fumble run all the way back for a touchdown.

In another feature of this football game, the player is able to make selections about team uniforms, the stadium where the game is played, night or day game, and other characteristics of a display driven by the ESE 806, although these selections are not a mandatory element.

In another feature of this game, the display driven by the ESE 806 is the display of record for the RW game, such that the outcome of the RW game is not displayed through both the ESE (via the GW user interface 814) and the RW user interface 812.

The advantage of such an architecture is that entertainment function provided by a slot machine could be greatly enhanced over today's offerings by providing a method by which the plethora of entertainment gaming software from home entertainment console software giants could be interfaced to provide an entertainment overlay for a traditional slot machine game.

Figure 9:
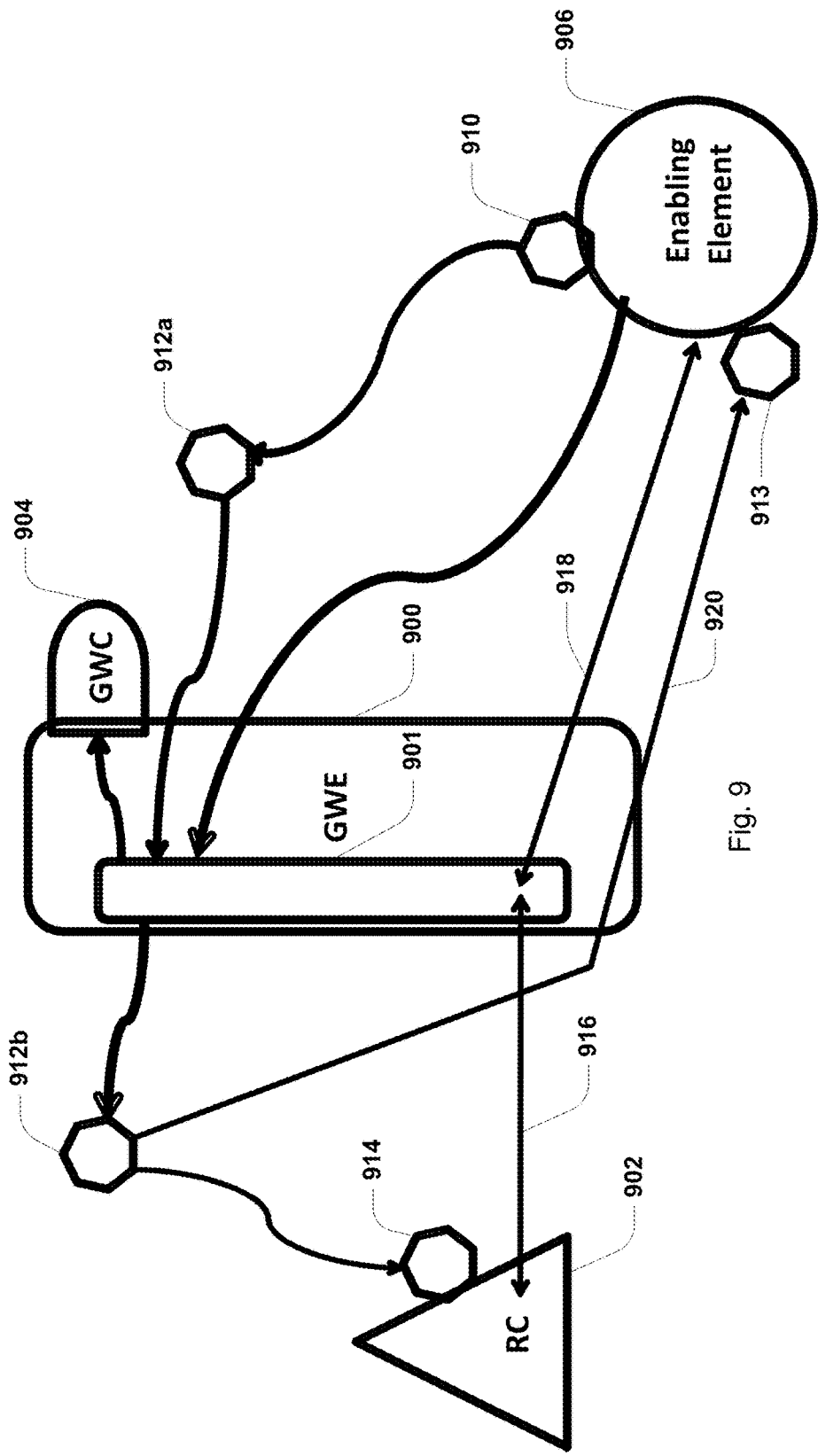
FIG. 9 is a collaboration diagram illustrating an exemplary throttle control for restricting R world Credit (RC) expenditure in a gaming system.

In another aspect, FIG. 9 illustrates an exemplary throttle control 901 for managing RC 902 expenditure in a gaming system. A casino or player may limit RC expenditure using a throttle control. The throttle control scales the relationship between the EE and the RC. For example, the throttle control could be adjusted to one EE corresponding to one credit, or ten EEs corresponding to one credit, or one EE corresponding to ten credits, etc., etc. The function operating within the throttle control that manages this relationship can be affected by the casino through the GWE in real-time, and/or as a function of predetermined formulae that reflect a range of inputs including player profile, time of day, etc.

In another aspect, the throttle control also manages the relationship between actions in the entertainment game of an ESE (not shown) and the accumulation of GWC 904. A similar set of functions are used as when managing the correlation between the EE 906 and the RC 902 with the added dimension that the relationship between actions in an entertainment game of the ESE and the GWC can also be affected by the correlation between the EE and the RC.

The throttle control is used by the casino to alter the cost to play the game, and indirectly the rate at which RC 902 is consumed (as a function of enabling element execution). It does this by managing the correlation between the EE 906 and RC.

In operation, a player executes (910) an action in an entertainment game of an ESE (not shown) via consumption of EE 906 for the ESE. A gambling game of an RWE (not shown) is triggered (912b), thus consuming RC. The throttle control translates the amount of EE consumed 920 into a specific amount of RC 922 to be consumed when triggering the gambling game of the RWE. As the entertainment game of the ESE is triggered, EE is consumed in direct correlation, and simultaneously with consumption of correlated RC as managed by the throttle control.

In addition, the GWC 904 is augmented or reduced (926a and 926b) as appropriate based on the triggering (912) of events in the entertainment game of the ESE (not shown). The throttle control can also scale the acquisition of GWC by the player as a function of the scalar function that defines the translation of an enabling element into the GWC.

Furthermore, the gambling game of the RWE outcome augments (914) the RC 902 via (916) the throttle control 901 if the player wins (930) after a triggering (912b) of the gambling game and the EE 906 is also augmented (913) via (920) the throttle control simultaneously if the RC is augmented, thus maintaining the correlated nature of the RC and the EE during augmentation of the RC.

In another aspect, the throttle control is implemented as a collar that places a limit on the amount of RC 902 that may be lost (as opposed to bet) in one or a multitude of different conditions as described above. The collar can also include limits on both the amount to be bet and the amount to be lost. During game operation, a check is run against the collar relative to each of the one or multitude of limits put in place before each time the GWE 900 triggers (912b) a gambling game of the RWE (not shown) in which a specific amount of RC is to be wagered.

When the limit is reached the GWE 900 can institute a number of actions. In one implementation, the player or casino can manually override the collar, effectively resetting it. In another implementation, the player is precluded from playing the game (or any game on the floor in another implementation) until a specific amount of time has elapsed. In implementations where manual override is not allowed, or when the user chooses not to override the collar, the machine cashes out the remaining RC 902 to the player.

To the extent that the collar is reached before the entertainment game within an ESE (not shown) has reached its logical conclusion the GWE 900 can initiate a process by which the state of the game is saved for later re-entry by the player, or in another implementation, the player is allowed to play out the remainder of the game or to play the game for a limited amount of time before play is terminated. This extended play period after the collar is reached does not cause the GWE to initiate gambling games via the RWE (not shown) and GWC may or may not be accumulated in keeping with a setting selected by the casino.

Figure 10:
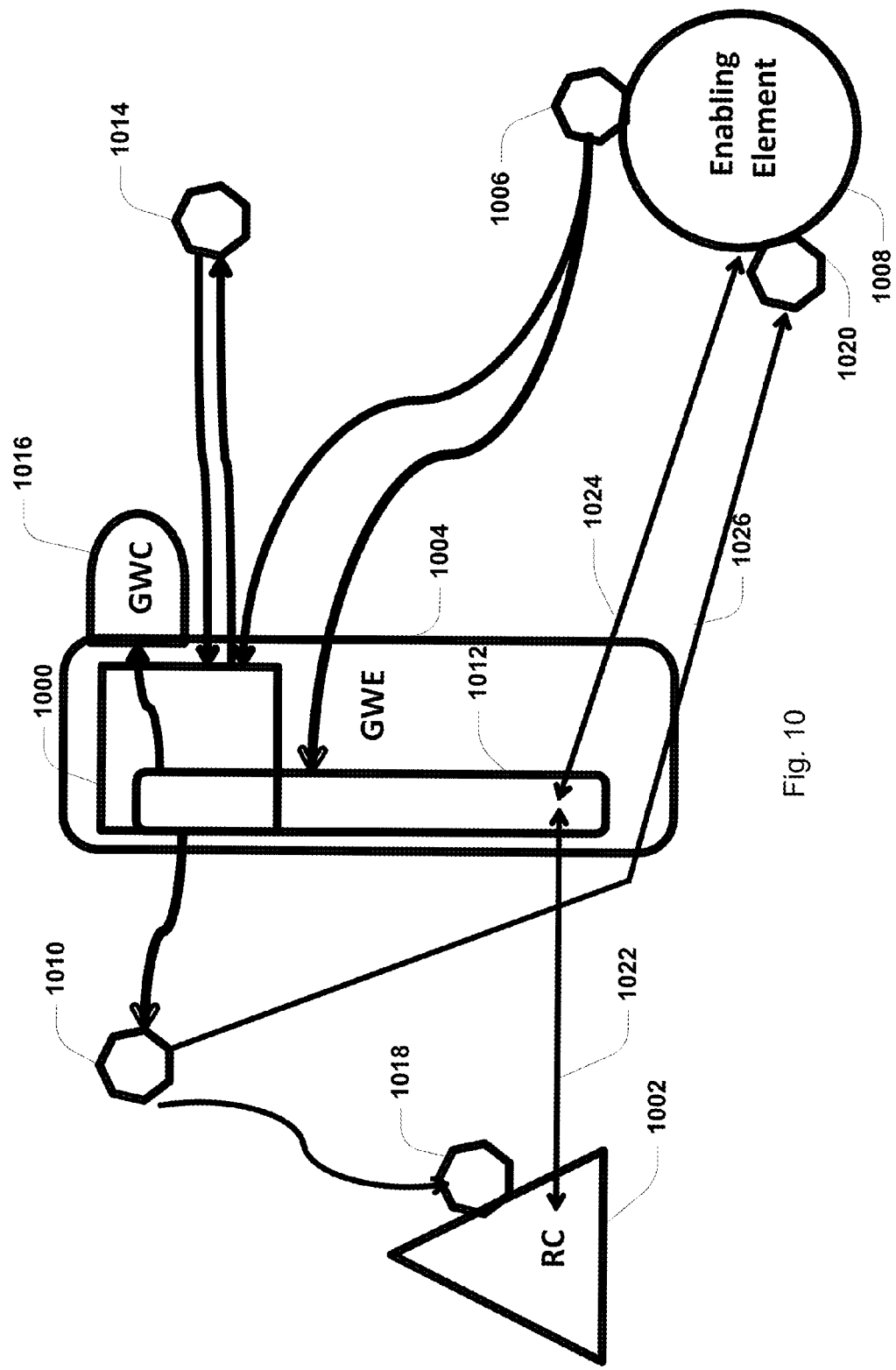
FIG. 10 is a collaboration diagram illustrating an exemplary pacer for regulating the RC expenditure in a gaming system.

In another aspect, FIG. 10 is a collaboration diagram illustrating an exemplary pacer 1000 for regulating expenditure of RC 1002 expenditure in a gaming system. The pacer is used by a GWE 1004 to limit the rate of gambling or restrict gambling altogether. The pacer contains a set of operating parameters defined by the casino and/or the player (either through the game or via presets attached to a particular player profile) that restricts the rate at which the RC is consumed (and by extension the pace of an entertainment game of an ESE (not shown)), or which the pacer cuts off gambling altogether when a preset limit is hit (said limit being an amount of money wagered and/or lost). The pacer can shift the operation of the entertainment game such that when a limit is hit the entertainment game becomes a "pay for play time" as is the case with a standard arcade game or it can pause the game altogether and via the GWE and its user interfaces present the player with one of a multitude of options including the ability to manually override the limit and continue, to save the state of the game and be cashed out, or to abandon the game and cash out. The pacer subsystem of the GWE, when implemented, effectively (from a logic standpoint) stands between the execution of an EE 1008 and the communication of that information to all other elements of the system, it accepts input to shape the controls over the rate and total amount of money gambled and/or lost, and provides output as to the player's status when certain limits are reached, providing in some embodiments the player with options in that context.

In operation, a player executes (1006) an action in an entertainment game of an ESE (not shown). The execution of the action would normally involve an immediate consumption of the EE 1008 by the entertainment game. However, the execution of the action sends (1007) an amount of requested EE for consumption to the pacer 1000. The pacer then sets the rate of consumption of EE to within an acceptable value and confirms that the execution of the action will not exceed a specified limit as to a total amount. If the rate and total amount are acceptable, the action is enabled (1014) causing consumption of the EE. In addition, the pacer moderates the augmentation or reduction of the GWC 1016, as indicated by links 1015a and 1015b. In addition to regulating the consumption of EE, the pacer also regulates the consumption of RC in a like manner through the throttle control 1001 as previously described. Specifically, a gambling game of an RWE (not shown) is triggered (1010), thus consuming RC as regulated by the pacer and the throttle control. The throttle control translates the amount of EE consumed (1020) into a specific amount of RC 1022 to be consumed when triggering the gambling game of the RWE. As the entertainment game of the ESE is triggered, EE is consumed in direct correlation, and simultaneously with consumption of correlated RC as managed by the throttle control and regulated by the pacer. The outcome of the gambling game of the RWE outcome augments (1018) the RC 1002 via (1024) the throttle control 1001 if the player wins (1030) after a triggering (1010) of the gambling game. The EE 1008 is also augmented (1032) via (1034) the throttle control simultaneously if the RC is augmented, thus maintaining the correlated nature of the RC and the EE during augmentation of the RC.

Figure 11:
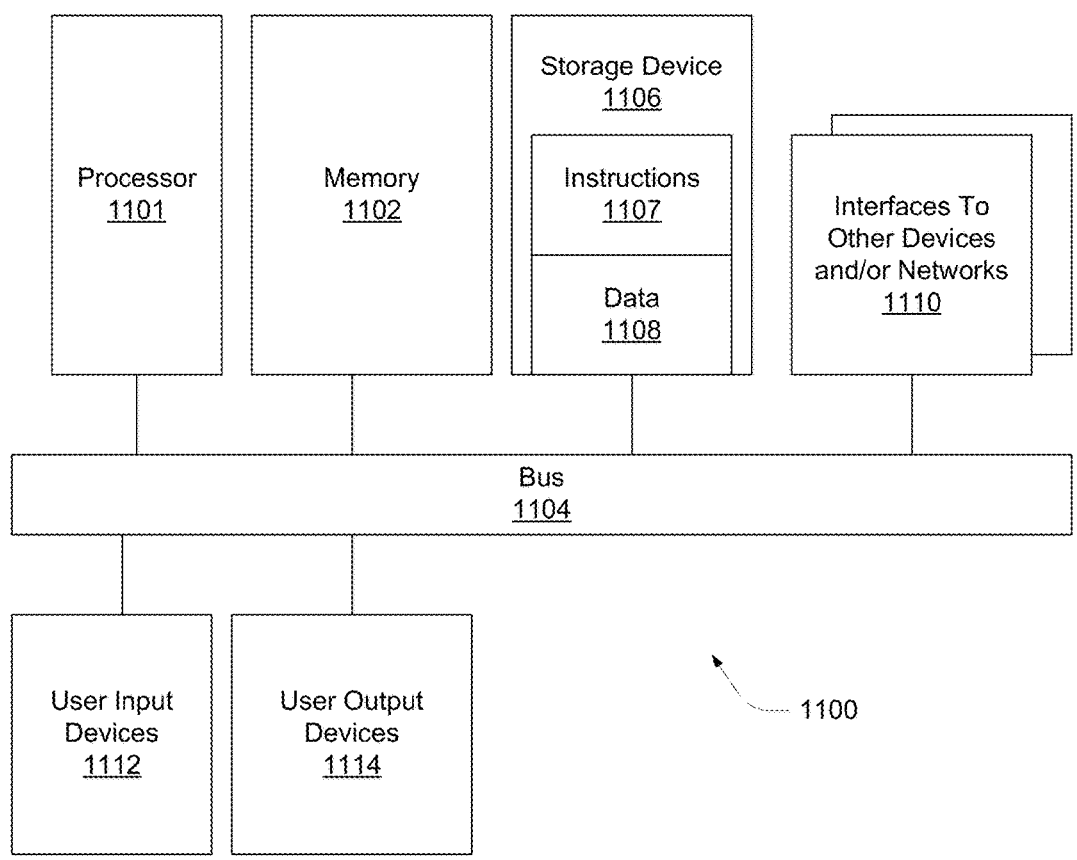
FIG. 11 is a hardware architecture diagram of a processing apparatus that may be used to host the various portions of the gaming system.

FIG. 11 is a hardware architecture diagram of a processing apparatus 1100, such as a gaming machine, a general purpose computer, a computing device or a controller, that may be used to host various components of a gaming system as previously described herein. In the processing device, a processor 1101 is coupled to a memory 1102 by a bus 1104. The processor is also coupled to non-transitory processor-readable storage media, such as storage device 1106 that stores processor-executable instructions 1107 and data 1108. The processor is also coupled to one or more interfaces 1110 that may be used to connect the processor to other processing apparatuses as well as networks as previously described herein. The processor is also coupled via the bus to user input devices 1112 and user output devices 1114.

In operation, the processor 1101 loads instructions 1107 and data 1108 into memory 1102 and executes the instructions and operates on the data to implement the various aspects and features of the components of a gaming system as described herein. The processor uses the user input devices 1112 and user output devices 1114 in accordance with the instructions and data in order to create and operate user interfaces for players, casino operators, owners, etc. as previously described herein.

It should be understood that although the processing apparatus 1101 is described herein as being constructed from processor instructions stored and executed by hardware components, the processing apparatus can be composed of only hardware components. In addition, although the storage device 1106 is described as being coupled to the processor through a bus, those skilled in the art of processing apparatuses will understand that the storage device could include removable media such as a USB memory device, an optical CD ROM, magnetic media such as tape or disks, etc. Also, the storage device could be accessed through one of the interfaces 1110 or over a network. Furthermore, any of the user input devices 1112 or user output devices 1114 could be coupled to the processor via one of the interfaces or over a network. In addition, although a single processor is described, those skilled in the art will understand that the processor could be a controller or other computing device or a separate computer as well as be composed of multiple processors or computing devices.

It should also be understood that an RWE, a GWE and an ESE as described herein can be implemented on multiple processing apparatuses, whether dedicated, shared or distributed in any combination thereof, or may be implemented on a single processing apparatus. In addition, while certain aspects and features of a gaming system described herein have been attributed to an RWE, a GWE or an ESE, these aspects and features may be implemented in a hybrid form where any of the features or aspects may be performed by any of an RWE, a GWE or an ESE within a gaming system without deviating from the spirit of the invention.

Although certain specific features and aspects of the present invention have been described herein, many additional modifications and variations would be apparent to those skilled in the art. For example, the features and aspects described herein may be implemented independently, cooperatively or alternatively without deviating from the spirit of the invention. It is therefore to be understood that the present invention may be practiced otherwise than as specifically described. Thus, the foregoing description of the invention should be considered in all respects as illustrative and not restrictive, the scope of the invention to be determined by any claims supported by this application and the claims' equivalents, rather than the foregoing description.

What is claimed is:

1. A gaming machine, comprising:
   a game world engine comprising a game world user interface; and
   a real world engine comprising:
      a real world user interface; and
      a random number generator,
   wherein the game world engine is constructed to:
      provide, via the game world interface to a player, an entertainment game comprising a plurality of levels;
      generate a trigger based on a player action of the player using an enabling element of the entertainment game during the player's play of the entertainment game;
      accumulate game world credit for the player based on the player's use of the enabling element;
      determine a progress from a first level of the plurality of levels of the entertainment game to a second level of the plurality of levels of the entertainment game on the basis of the game world credit; and
      select a level real world credit play table on the basis of the progress from the first level of the plurality of levels of the entertainment game to the second level of the plurality of levels of the entertainment game, and
   wherein the real world engine is constructed to:
      receive via the real world user interface, real world credits input by the player;
      receive the trigger from the game world engine; and
      execute in response to the trigger, a gambling game to determine a gambling outcome using the random number generator, the level real world credit pay table, and a wager of an amount of the real world credit.

2. The gaming machine of claim 1, wherein the entertainment game is a video game.

3. The gaming machine of claim 2, wherein the video game is a road racing game.

4. The gaming machine of claim 2, wherein the video game is a marksmanship game.

5. The gaming machine of claim 2, wherein the video game is a boxing game.

6. The gaming machine of claim 2, wherein the video game is a first person shooter game.

7. The gaming machine of claim 2, wherein the video game is a board game.

8. The gaming machine of claim 2, wherein the video game is a strategy game.

9. A gaming machine, comprising:
   a real world user interface;
   a game world user interface;
   a random number generator; and
   a processor coupled to the real world user interface, game world user interface, and random number generator, wherein the processor is further coupled to a processor-readable storage media storing processor-executable instructions that when executed by the processor cause the processor to:
      receive, via the real world user interface, real world credits input by a player;
      provide, via the game world interface, an entertainment game wherein the entertainment game has a plurality of levels;
      trigger execution of a gambling game to determine a gambling outcome using the random number generator, a first level real world credit pay table, and a wager of an amount of the real world credit in response to a player action of the player using an enabling element of the entertainment game during the player's play of the entertainment game, wherein the first level real world pay table is associated with a first level of the plurality of levels of the entertainment game;
      accumulate game world credit for the player based on the player's use of the enabling element;
      determine a progress from a first level of the plurality of levels of the entertainment game to a second level of the plurality of levels of the entertainment game on the basis of the game world credit; and
      select a second level real world credit play table on the basis of the progress from the first level of the plurality of levels of the entertainment game to the second level of the plurality of levels of the entertainment game.

10. The gaming machine of claim 9, wherein the entertainment game is a video game.

11. The gaming machine of claim 10, wherein the video game is a road racing game.

12. The gaming machine of claim 10, wherein the video game is a marksmanship game.

13. The gaming machine of claim 10, wherein the video game is a boxing game.

14. The gaming machine of claim 10, wherein the video game is a first person shooter game.

15. The gaming machine of claim 10, wherein the video game is a board game.

16. The gaming machine of claim 10, wherein the video game is a strategy game.

17. A method of a gaming machine, comprising:
   receiving, via a real world user interface, real world credits input by a player;

providing, via a game world interface, an entertainment game comprising a plurality of levels;

triggering execution of a gambling game to determine a gambling outcome using a random number generator, a first level real world credit pay table, and a wager of an amount of the real world credit in response to a player action of the player using an enabling element of the entertainment game during the player's play of the entertainment game, wherein the first level real world pay table is associated with a first level of the plurality of levels of the entertainment game;

accumulating game world credit for the player based on the player's use of the enabling element;

determining a progress from a first level of the plurality of levels of the entertainment game to a second level of the plurality of levels of the entertainment game on the basis of the game world credit; and selecting a second level real world credit play table on the basis of the progress from the first level of the plurality of levels of the entertainment game to the second level of the plurality of levels of the entertainment game.

18. The method of a gaming machine of claim 17, wherein the entertainment game is a video game.

19. The gaming machine of claim 18, wherein the video game is a strategy game.

20. The gaming machine of claim 18, wherein the video game is a first person shooter game.

\* \* \* \* \*